(12) United States Patent
Dimmick

(10) Patent No.: US 11,978,051 B2
(45) Date of Patent: May 7, 2024

(54) AUTHENTICATING REMOTE TRANSACTIONS USING A MOBILE DEVICE

(71) Applicant: Visa International Service Association, San Francisco, CA (US)

(72) Inventor: James Dene Dimmick, Belmont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 406 days.

(21) Appl. No.: 16/689,994

(22) Filed: Nov. 20, 2019

(65) Prior Publication Data

US 2020/0090182 A1 Mar. 19, 2020

Related U.S. Application Data

(62) Division of application No. 14/102,332, filed on Dec. 10, 2013, now Pat. No. 10,521,794.

(60) Provisional application No. 61/833,816, filed on Jun. 11, 2013, provisional application No. 61/804,950, filed on Mar. 25, 2013, provisional application No. 61/735,509, filed on Dec. 10, 2012.

(51) Int. Cl.
*G06Q 20/40* (2012.01)
*G06Q 20/36* (2012.01)
*G06Q 20/38* (2012.01)

(52) U.S. Cl.
CPC ......... *G06Q 20/4014* (2013.01); *G06Q 20/36* (2013.01); *G06Q 20/3674* (2013.01); *G06Q 20/385* (2013.01); *G06Q 20/4012* (2013.01)

(58) Field of Classification Search
CPC .............. G06Q 20/4014; G06Q 20/36; G06Q 20/3674; G06Q 20/385; G06Q 20/4012
See application file for complete search history.

(56) References Cited

U.S. PATENT DOCUMENTS 5,485,510 A 1/1996 Colbert
5,745,576 A 4/1998 Abraham et al.
(Continued)

FOREIGN PATENT DOCUMENTS

JP 2006190112 7/2006
WO 2014093390 6/2014

OTHER PUBLICATIONS

"A Multi-Factor Security Protocol for Wireless Payment—Secure Web Authentication Using Mobile Devices"; Ayu Tiwari, Sudip Sanyal, Ajith Abraham, Svein Johan Knapskog, Sugata Sanyal; (Year: 2011).*

(Continued)

*Primary Examiner* — John W Hayes
*Assistant Examiner* — Edgar R. Martinez-Hernandez
(74) *Attorney, Agent, or Firm* — Kilpatrick Townsend & Stockton LLP

(57) ABSTRACT

Embodiments of the invention can combine card not present transaction processing with PIN verification. A merchant or a consumer can initiate transactions using any suitable transaction initiation channel. One aspect of the invention helps facilitate payment card authentication across multiple wallet providers/merchants using an encrypted card PIN and a digital certificate. One aspect of the invention can incorporate the use of different transaction networks to perform authentication and authorization processing.

17 Claims, 10 Drawing Sheets

(56) References Cited

U.S. PATENT DOCUMENTS

| | | | |
|---|---|---|---|
| 6,311,171 B1 | 10/2001 | Dent | |
| 6,327,578 B1 | 12/2001 | Linehan | |
| 7,103,575 B1 | 9/2006 | Linehan | |
| 7,310,042 B2 * | 12/2007 | Seifert | G07C 9/257 340/5.82 |
| 7,506,812 B2 | 3/2009 | Von Mueller et al. | |
| 7,606,560 B2 | 10/2009 | Labrou et al. | |
| 7,827,115 B2 | 11/2010 | Weller et al. | |
| 8,316,237 B1 | 11/2012 | Felsher et al. | |
| 8,412,631 B2 | 4/2013 | Crofts et al. | |
| 8,682,802 B1 | 3/2014 | Kannanari | |
| 8,784,314 B2 * | 7/2014 | Mathew | A61B 6/00 600/437 |
| 9,342,832 B2 | 5/2016 | Basu et al. | |
| 9,467,425 B2 | 10/2016 | Epp et al. | |
| 10,521,794 B2 * | 12/2019 | Dimmick | G06Q 20/3674 |
| 10,528,944 B2 * | 1/2020 | Khan | H04W 12/068 |
| 2002/0161723 A1 * | 10/2002 | Asokan | G06Q 20/401 705/51 |
| 2003/0005310 A1 * | 1/2003 | Shinzaki | G06Q 20/40145 713/186 |
| 2003/0051138 A1 * | 3/2003 | Maeda | H04M 15/48 713/168 |
| 2003/0115142 A1 * | 6/2003 | Brickell | G07C 9/22 705/51 |
| 2005/0160052 A1 * | 7/2005 | Schneider | G06F 21/32 705/67 |
| 2005/0171898 A1 * | 8/2005 | Bishop | G06Q 20/327 705/39 |
| 2005/0182724 A1 | 8/2005 | Willard | |
| 2005/0222961 A1 | 10/2005 | Staib et al. | |
| 2005/0256806 A1 | 11/2005 | Tien et al. | |
| 2005/0262026 A1 | 11/2005 | Watkins et al. | |
| 2005/0268107 A1 * | 12/2005 | Harris | H04L 63/0853 713/182 |
| 2006/0006226 A1 * | 1/2006 | Fitzgerald | G06Q 20/322 235/380 |
| 2006/0016874 A1 * | 1/2006 | Bonalle | G06K 19/0716 235/380 |
| 2006/0186195 A1 * | 8/2006 | Gray | G06Q 20/32 235/380 |
| 2006/0212407 A1 | 9/2006 | Lyon | |
| 2007/0038863 A1 * | 2/2007 | Nguyen | G06F 21/6254 713/176 |
| 2007/0119923 A1 * | 5/2007 | Garrison | G06Q 20/341 235/380 |
| 2007/0257105 A1 * | 11/2007 | Owen | G06F 21/32 235/380 |
| 2008/0301056 A1 | 12/2008 | Weller et al. | |
| 2009/0037982 A1 | 2/2009 | Wentker et al. | |
| 2009/0070270 A1 * | 3/2009 | Robinson | G06Q 20/20 705/66 |
| 2009/0124376 A1 * | 5/2009 | Kelly | G07F 17/3239 463/29 |
| 2009/0228362 A1 * | 9/2009 | Lapsley | G06Q 20/18 705/44 |
| 2010/0063895 A1 | 3/2010 | Dominguez et al. | |
| 2010/0146263 A1 | 6/2010 | Das et al. | |
| 2010/0161470 A1 * | 6/2010 | Wiesman | G06F 21/31 705/35 |
| 2010/0180328 A1 * | 7/2010 | Moas | H04L 63/0838 726/6 |
| 2010/0191602 A1 | 7/2010 | Mikkelsen et al. | |
| 2010/0211507 A1 | 8/2010 | Aabye et al. | |
| 2011/0082767 A1 | 4/2011 | Ryu et al. | |
| 2011/0208657 A1 | 8/2011 | Rao et al. | |
| 2011/0213711 A1 | 9/2011 | Skinner et al. | |
| 2011/0231332 A1 | 9/2011 | Abraham et al. | |
| 2012/0005732 A1 * | 1/2012 | Shinzaki | G06F 21/32 726/6 |
| 2012/0030047 A1 | 2/2012 | Fuentes et al. | |
| 2012/0032782 A1 * | 2/2012 | Colella | G06Q 20/385 340/5.83 |
| 2012/0095852 A1 | 4/2012 | Bauer et al. | |
| 2012/0116976 A1 | 5/2012 | Hammad et al. | |
| 2012/0130903 A1 | 5/2012 | Dorsey et al. | |
| 2012/0136796 A1 * | 5/2012 | Hammad | G06Q 20/3825 705/67 |
| 2012/0158591 A1 * | 6/2012 | Hammad | G06Q 20/085 705/44 |
| 2012/0259782 A1 | 10/2012 | Hammad | |
| 2013/0031369 A1 | 1/2013 | Balinsky et al. | |
| 2013/0226812 A1 | 8/2013 | Landrok et al. | |
| 2013/0269003 A1 * | 10/2013 | Wentker | G06Q 30/06 726/4 |
| 2013/0290136 A1 * | 10/2013 | Sheets | G06Q 30/0609 705/26.35 |
| 2014/0164254 A1 * | 6/2014 | Dimmick | G06Q 20/4014 705/44 |
| 2014/0279514 A1 * | 9/2014 | Sharp | G06F 21/42 705/44 |
| 2015/0295709 A1 * | 10/2015 | Botero Montano | G06Q 20/40145 713/184 |
| 2018/0253714 A1 * | 9/2018 | Choi | G06Q 20/3255 |

OTHER PUBLICATIONS

"Combined Web/Mobile Authentication for Secure Web Access Control"; Ali Al-Qayedi, Wael Adi, Ahmed Zahro, Ali Mabrouk; 2004 IEEE Wireless Communications and Networking Conference (IEEE Cat. No.04TH8733) (vol. 2, pp. 677-681 vol. 2); (Year: 2004).*

"Enhanced Authentication Services for Internet Systems using Mobile Networks"; M. Looi; GLOBECOM'01. IEEE Global Telecommunications Conference (Cat. No. 01CH37270) (vol. 6, pp. 3468-3472 vol.6) (Year: 2001).*

U.S. Appl. No. 14/102,332 , "Final Office Action", dated Nov. 16, 2017.

U.S. Appl. No. 14/102,332 , "Non Final Office Action", dated Mar. 24, 2017, 22 pages.

U.S. Appl. No. 14/102,332 , "Non-Final Office Action", dated Dec. 14, 2018, 36 pages.

U.S. Appl. No. 14/102,332 , "Notice of Allowance", dated Aug. 20, 2019, 14 pages.

U.S. Appl. No. 14/102,332 , "Restriction Requirement", dated Nov. 28, 2016, 6 pages.

Dala'In et al., "Using a Mobile Device to Enhance Customer Trust in the Security of Remote Transactions", 8th IEEE International Conference on Computer and Information Technology, 2008.

Kumar et al., "A System Model and Protocol for Mobile Payment Consortia System", 2009 International Conference on Test and Measurement, 2009.

Li et al., "Secure Remote Mobile Payment Architecture and Application", 2010 International Symposium on Computer, Communication, Control and Automation (3CA), 2010.

PCT/US2013/074200 , "International Preliminary Report on Patentability", dated Jun. 25, 2015, 12 pages.

PCT/US2013/074200 , "International Search Report and Written Opinion", dated Mar. 27, 2014, 14 pages.

* cited by examiner

AUTHENTICATING REMOTE TRANSACTIONS USING A MOBILE DEVICE

CROSS-REFERENCES TO RELATED APPLICATIONS

This application is a divisional application of U.S. patent application Ser. No. 14/102,332, filed on Dec. 10, 2013, which is a non-provisional application of and claims the benefit of priority of U.S. Provisional Application No. 61/735,509 filed on Dec. 10, 2012, U.S. Provisional Application No. 61/804,950 filed on Mar. 25, 2013, and U.S. Provisional Application No. 61/833,816 entitled "Remote Authentication System Incorporating Authentication Token" filed on Jun. 11, 2013, each of which is herein incorporated by reference in its entirety for all purposes.

BACKGROUND

Traditional remote payment transactions (e.g., card not present transactions) suffer from a number of problems. Before conducting a remote transaction, a consumer may have to provide payment card details such as an account number and identification information to identify consumer over a remote channel such that the consumer can be authenticated. In most cases, issuers may need to devote substantial resources for development and integration work or have transaction limits imposed in order to control risks. For example, the issuers may need to devote resources to provide authentication services to verify the identity of the consumer, which may add to transaction processing delays as well as costs.

Mobile wallet solutions for conducting remote transactions are also gaining popularity. Another problem associated with the remote transactions is the payment liability faced by the mobile wallet providers. Current wallet provider solutions do not have a way to validate a payment account and authenticate the consumer for a remote transaction. As a result, wallet providers have to bear the cost of unauthorized transactions resulting in loss of revenues.

Embodiments of the invention address these and other problems, individually and collectively.

BRIEF SUMMARY

Embodiments of the invention are directed to improved authentication solutions.

One embodiment of the invention is directed to a method comprising receiving transaction details at an authentication server computer, wherein the transaction details are for a transaction conducted by a consumer using an account associated with an issuer and initiating, by the authentication server computer, an authentication request message to a mobile device operated by the consumer before communicating with the issuer. The method further comprises receiving, by the authentication server computer, a personal identifier from the mobile device before communicating with the issuer, and after receiving the personal identifier from the mobile device, initiating the sending of an authorization request message comprising an account identifier associated with the account to the issuer.

Another embodiment of the invention is directed to an authentication server computer comprising a processor and a computer readable medium comprising code, executable by the processor, for implementing a method comprising receiving transaction details, wherein the transaction details are for a transaction conducted by a consumer using an account associated with an issuer and initiating an authentication request message to a mobile device operated by the consumer before communicating with the issuer. The method implemented by the processor further comprises receiving, a personal identifier from the mobile device before communicating with the issuer, and after receiving the personal identifier from the mobile device, initiating the sending of an authorization request message comprising an account identifier associated with the account to the issuer.

Another embodiment of the invention is directed to a system comprising a mobile device and an authentication server computer communicatively coupled to the mobile device via a first communication network, wherein the authentication server computer comprises a processor and a computer readable medium comprising code, executable by the processor, for implementing a method comprising receiving transaction details, wherein the transaction details are for a transaction conducted by a consumer using an account associated with an issuer and initiating an authentication request message to the mobile device operated by the consumer before communicating with the issuer. The method implemented by the authentication server computer further comprises receiving a personal identifier from the mobile device before communicating with the issuer, and after receiving the personal identifier from the mobile device, initiating the sending of an authorization request message comprising an account identifier associated with the account to the issuer.

Another embodiment of the invention is directed to a method comprising receiving a personal identifier by an authentication server computer and sending, by the authentication server computer, the personal identifier to an issuer computer in a zero dollar authorization request message over a first payment network. The method further comprises receiving an authorization response message comprising an authentication indicator from the issuer computer, and forwarding the authentication indicator to a gateway computer, wherein the gateway computer initiates a transaction authorization request message to the issuer computer including the authentication indicator over a second payment network.

Another embodiment of the invention is directed to a method comprising receiving, by an authentication server computer, a personal identifier associated with a consumer's account with an issuer and sending, by the authentication server computer, the personal identifier to an issuer computer in a zero dollar authorization request message. The method further comprises receiving an authorization response message comprising an authentication indicator from the issuer computer and initiating a request to a mobile device operated by the consumer for registering one or more biometric identifiers. The method further comprises receiving the one or more biometric identifiers from the mobile device and associating, by the authentication server computer, the one or more biometric identifiers with the personal identifier.

These and other embodiments of the invention are described in further detail below.

DETAILED DESCRIPTION

Figure 1:
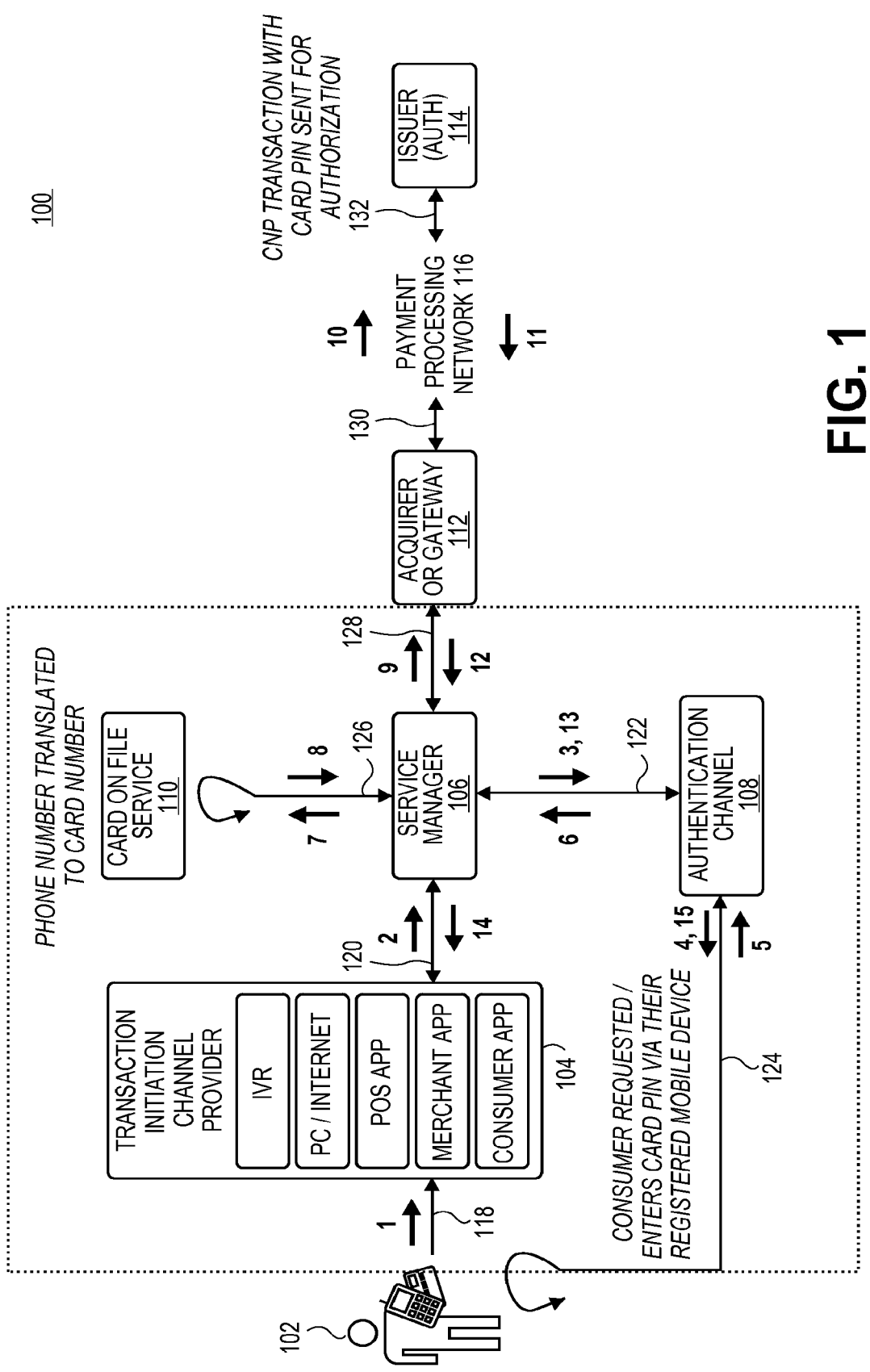
FIG. 1 shows a system diagram illustrating a process flow according to an embodiment of the invention.

Authentication approaches for remote payment transactions may involve, customers identifying themselves via KYC (Know Your Customer) data. For example, one such prior approach may involve first determining a trusted party or an issuer that may be associated with a customer's payment account. In such approach, customer identifying information may be forwarded to the issuer for the issuer to authenticate the customer before a remote transaction can be authorized. Embodiments of the invention provide improved process flows by authenticating the customer using a personal identifier or biometric identifier before communicating with the issuer.

Embodiments of the invention can combine card not present (CNP) transaction processing with PIN (Personal Identification Number) verification. This approach involves a payment account issuer receiving a payment account number during a card-not-present transaction along with a corresponding PIN (or other identifier) that is more typically used at a POS (Point-of-Sale) or an ATM (Automated Teller Machine) terminal. A consumer can provide the PIN or another identifier (e.g., biometrics) on their registered mobile device for authentication. In some embodiments, the issuer can authenticate and authorize the transaction in one combined step. In some embodiments, the PIN may be encrypted and this can ensure that the overall payment system from the mobile device to the financial system performs the transaction in a secured manner. One embodiment of the invention can incorporate the use of different transaction networks to perform authentication and authorization processing.

Some embodiments of the invention can facilitate payment card authentication across multiple wallet providers/merchants and inextricably link this authentication to a payment liability shift (e.g., from the wallet provider/merchant to the issuer). In one embodiment, such an approach or service may be provided by a payment processing network such as Visanet®. In one embodiment, an authentication application module may be embedded in the wallet provider's application to enable card PIN entry on the consumer's mobile device. An API (Application Programming Interface) may be configured to facilitate data exchange between the wallet provider's core system and the core system associated with the payment processing network. Combining a liability shift with improved consumer authentication can be highly attractive to wallet providers as the current solutions do not provide a mechanism for the wallet providers to validate whether the card or account number used by the consumer is authentic. For example, the liability shift may allow the wallet providers to avoid some of the risks and costs associated with unauthorized transactions. The resulting transaction, a PIN authenticated card-not-present transaction, can then be authorized by the issuer assuming the card PIN is correct and there are sufficient funds. In some embodiments, a standalone authentication application may be used to benefit small merchants, payment service providers (PSPs), etc.

Prior to discussing embodiments of the invention, description of some terms may be helpful in understanding embodiments of the invention.

"Authentication" may refer to validating an entity such as a consumer or a consumer device to determine if the entity is who it claims to be. Authentication may include validating one or more identifiers associated with the entity. For example, authenticating a consumer may include validating if a PIN, a biometric identifier or a personal identifier provided by the consumer matches with the PIN, biometric identifier or the personal identifier respectively stored in a database record associated with the consumer's account. In some embodiments, a consumer may be authorized to conduct a financial transaction only if the consumer has been authenticated.

An "authentication request message" may refer to a message used for requesting authentication of a consumer. For example, an authentication request message may be sent to a consumer's mobile device requesting the consumer to provide a PIN, a biometric identifier or a personal identifier for authentication before a transaction can be authorized.

An "authentication indicator" may refer to a result of an authentication process. In one embodiment, the authentication indicator may include a positive authentication result or a negative authentication result. In one embodiment, the authentication indicator may be represented in binary form (e.g., a "1" for a positive authentication result and a "0" for a negative authentication result). However, other representations are possible.

A "personal identifier" may refer to an identifier associated with a consumer that may be used to authenticate the consumer. Some non-limiting examples of a personal identifier may include a Personal Identification Number (PIN), a biometric identifier or a password. In one embodiment, a PIN may include numerals, alphabets or alpha-numeric characters. Some non-limiting examples of biometric identifiers may include fingerprints, facial expressions, voice, palm prints, hand geometry, iris recognition, DNA, retina and odour/scent. In some embodiments, alternative identifiers may be used for authentication such as sound, a picture or a particular sequence of pictures or a behavioural pattern.

"Transaction details" may include information associated with a transaction. The transaction may be a purchase transaction, money transfer, ATM transaction, cash withdrawal, etc. In one embodiment, transaction details may include a consumer alias, a payment card type, a transaction amount, a merchant identifier, a phone number or any such relevant information associated with the transaction. In one embodiment, transaction details may include geo-location data associated with the consumer and/or the merchant. In one embodiment, transaction details may also include details related to the purchase such as a number of items purchased, quantity of each item, description of each item, a coupon or discount code used, a transaction type, transaction date and time, etc.

An "authorization request message" may be an electronic message that is used to request authorization for a transaction. In some embodiments, an authorization request message may be sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example: a service code, a verification value (e.g., a CVV (card verification value), a dCVV (dynamic card verification value), etc.), an expiration date, etc. An authorization request message may also comprise transaction details associated with a current transaction as well as any other information that may be utilized in determining whether to identify and/or authorize a transaction.

A "zero dollar authorization request message" may be an electronic message that is used to verify the identity of the consumer and/or the validity of a payment account. The zero dollar authorization request message may be sent to an issuer in some embodiments. In one embodiment, a zero dollar transaction (i.e., an authorization request message with a zero dollar amount) may provide an effective means for verification of the payment account number, personal identifier, address verification (AVS) and a card verification value (CVV, CVV2, or other variants, etc.). In one embodiment, the zero dollar authorization request message may include transaction details as well as a personal identifier provided by a consumer for authentication. In one embodiment, a zero dollar authorization request message may be generated to authenticate, authorize and register a consumer in a single step.

An "authorization response message" may be an electronic reply to an authorization request message. In some embodiment, an authorization response message may be generated by an issuing financial institution or a payment processing network to indicate whether a transaction is approved or denied. The authorization response message may include an authorization code, which may be a code that a credit card issuing bank returns in response to an authorization request message in an electronic message (either directly or through the payment processing network) to the merchant's access device (e.g. POS terminal) that indicates approval of the transaction. The code may serve as proof of authorization. As noted above, in some embodiments, a payment processing network may generate or forward the authorization response message to the merchant.

A "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as personal identifier, account numbers, CVV values, expiration dates, etc.) may be securely transmitted between the two entities to facilitate a transaction.

A "consumer" may be an entity, such as, an individual or a user that may be associated with one or more personal accounts and/or consumer devices. The consumer may be able to access an application or a website on a consumer device. The consumer may be able to register his/her personal information (e.g., name, address, phone number, personal identifier, etc.) and financial (e.g., account number, expiration date, consumer alias, etc.) information with an authentication service provider and/or a wallet provider.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

Authentication Using an Authentication Channel and Service Manager

FIG. 1 shows a system diagram illustrating a process flow according to an embodiment of the invention.

As shown in the figure, a system 100 may include a transaction initiation channel provider 104, a service manager 106, an authentication channel 108, a card-on-file (COF) service 110, an acquirer or gateway 112, an issuer 114 and a payment processing network 116. Note that each of these entities of the system 100 may be associated with a computer apparatus (e.g., a server computer) that may be implemented using some of the components as described with reference to FIG. 10. In one embodiment, an authentication server computer may implement some or all of the functionalities of the service manager 106 and/or the authentication channel 108. In one embodiment, different entities in FIG. 1 may communicate with each other using one or more communication networks such as the Internet, a cellular network, a TCP/IP network or any other suitable communication network.

The transaction initiation channel provider 104 may provide a communication channel for a consumer or a merchant to initiate a payment transaction. Examples of the transaction initiation channels may include a mobile initiation channel, an Internet initiated channel, a physical point of sale initiated channel, etc. For example, a consumer 102 may initiate a transaction using a mobile phone number or a mobile phone number barcode or QR code. Consumer initiated transactions can be initiated via a mobile application/mobile internet, IVR (Interactive Voice Response) system, SMS (Short Message Service) or USSD (Unstructured Supplementary Service Data) messages, and PC/internet portal. Merchant initiated transactions may be initiated via a mobile application/mobile internet, mobile POS, IVR system, SMS or USSD messages, PC/internet portal, in-store POS (for face to face purchases or money transfers), and remote POS (for phone purchases or money transfers). In other embodiments, there can be designated consumers who may be conducting a transaction on behalf of an account holder. For example, in embodiments of the invention, a family member may initiate a payment at a POS terminal instead of a primary account holder.

The service manager 106 may be a computer apparatus that may be configured to control the overall interactions between the different entities in system 100. These may include asking for and receiving the card PIN from the authentication channel 108, asking for and receiving the saved payment account number from the card-on-file service 110, asking for and receiving the authorization from the acquirer 112 and/or issuer 114, and completing the transaction, including sending a confirmation message to the consumer 102. In one embodiment, the service manager 106 may receive transaction details (e.g., mobile phone number, consumer alias, transaction amount, merchant identifier, etc.) for a transaction initiated by the consumer 102 using one of the transaction initiation channels via a communication channel 120. In one embodiment, transaction details may include geo-location data to provide additional transaction related information that may be used for risk assessment. The service manager 106 may forward the transaction details to the authentication channel 108 via a communication channel 122 to initiate the sending of an authentication request message to the consumer 102. The service manager 106 may forward the payment account number to the acquirer or gateway 112 via a communication channel 128 to initiate the sending of an authorization request message to the issuer 114. The service manager 106 may also forward an authorization response message received from the issuer 114 via the acquirer or gateway 112 to the authentication channel 108.

The authentication channel 108 may be configured to facilitate card PIN collection from the cardholder's mobile device via a mobile application or a SIM (Subscriber Identity Module)-based application. In one embodiment, the authentication channel 108 may initiate an authentication request message to the consumer's mobile device via a communication channel 124 before communicating with the issuer 114. Allowing the consumer to provide their card PIN via the consumer's mobile device and authenticating the PIN before communicating with the issuer 114 may provide an improved process flow for processing a transaction. For example, if the PIN is not authenticated, an unauthorized transaction can be stopped before a transaction authorization request message for the unauthorized transaction is generated. This can prevent a transaction authorization request message for an unauthorized transaction from being propagated throughout the payment processing system, and can reduce wasted computing resources and network traffic for processing such an unauthorized transaction. In one embodiment, a shared secret may be provided to the consumer 102 with the authentication request message. The consumer 102 may provide a personal identifier or the PIN (e.g., using the mobile application) in response to the authentication request message. In one embodiment, the personal identifier may be a biometric identifier. For example, the consumer may have previously registered one or more biometric identifiers, that may be stored in a database associated with the COF service 110. The authentication channel 108 may be configured to ensure secure transmission of the PIN/PIN block to the service manager 106 via the communication channel 122. Key management and mobile application provisioning can also be performed by the authentication channel 108. Suitable authentication channels may include mobile channels, Internet based channels, etc. The authentication channel 108 may receive the authorization response from the service manager 106 and send a confirmation message to the consumer 102 based on the authorization response.

The card-on-file (COF) service 110 may be configured to translate the mobile phone number into card details, and own and manage the phone-card database. The COF service 100 may receive the mobile phone number or the consumer alias associated with the transaction from the service manager 106 via a communication channel 126. The COF service 100 may retrieve an account identifier or a primary account number from the phone-card database and provide to the service manager 106. In one embodiment, the card-on-file (COF) service 110 may store payment account numbers and phone numbers provided by the consumers at the time of registration in the phone-card database.

The acquirer or gateway 112 may represent a traditional acquirer/acquirer processor. The acquirer 112 is typically a system for an entity (e.g., a bank) that has a business relationship with a particular merchant, a wallet provider or another entity. In one embodiment, the acquirer 112 may represent a gateway computer that may be configured to generate an authorization request message comprising the account identifier and the personal identifier and send the authorization request message to the issuer 114 via the payment processing network 116. In one embodiment, the acquirer 112 may forward the authorization request message to the payment processing network 116 and receive an authorization response message from the payment processing network 116 via a communication channel 130.

The payment processing network 116 may be configured to provide authorization services, and clearing and settlement services for payment transactions. The payment processing network 116 may include data processing subsystems, wired or wireless networks, including the internet. An example of the payment processing network 116 includes VisaNet®, operated by Visa®. The payment processing network 116 may include a server computer. In one embodiment, the payment processing network 116 may forward an authorization request received from the acquirer 112 to the issuer 114 via a communication channel 132. The payment processing network 116 may further forward an authorization response message received from the issuer 114 to the acquirer 112.

The issuer 114 may represent a traditional issuer/issuer processor and may be associated with an issuer computer. Typically, the issuer 114 may be associated with a business entity (e.g., a bank) that may have issued the payment (credit/debit) card, account numbers or payment tokens used for payment transactions. In some embodiments, the business entity (bank) associated with the issuer 114 may also function as an acquirer (e.g., the acquirer 112). In some embodiments of the invention, the issuer 114 can receive an authorization request message for a card not present transaction including the personal identifier (e.g., provided by the consumer using the consumer's mobile device) and may approve or decline the transaction as appropriate. In one embodiment, the issuer 114 may use a separate PIN for mobile remote payments than the PIN typically used for ATM/POS transactions.

In one embodiment, the consumers may be requested to register their card (or payment account) and phone number in a database, as described below. In one embodiment, the database may be associated with the COF service 110. Example use cases may include (1) the consumer 102 can pre-register these details before the first transaction (e.g., at an ATM, online banking, telephone banking); (2) the consumer 102 can provide these details at the point of their first transaction via the transaction initiation interface/merchant (e.g., the transaction initiation channel provider 104); and (3) the issuer 114 or other third party can send a database of card and phone numbers to the entity providing the service, for example, the service manager 106.

In some embodiments of the invention, the consumer 102 can only be activated in the system when the issuer 114 authorizes a transaction with the PIN or a personal identifier associated with the payment account or card. The payment account may be a credit, debit, or prepaid account. In order to complete the activation, the consumer 102 may be prompted, via their mobile device, to securely enter their card PIN to authenticate the transaction. This interaction can be over a different channel than the transaction initiation channel. For example, the consumer 102 may initiate a transaction at a POS terminal using a payment card, but can enter the PIN in their registered mobile device to authenticate the transaction. In some embodiments, the consumer may need to download a secure application onto their mobile device.

In some embodiments of the invention, the issuer 114 can receive an authorization request message including a personal identifier and approve or decline as appropriate. This may be for: (1) the consumer's first transaction, where the consumer is authenticated, authorized and registered in one step. For example, when a consumer selects goods/services and checks out, the consumer may be prompted to provide a personal identifier. The consumer may provide a card PIN using the consumer's mobile device. The card PIN and the payment account details may be sent to the issuer 114 via the authentication channel 108/service manager 106 and the payment gateway. The mobile phone number may be associated with the payment account details and stored in the phone-card database associated with the COF service 110; and/or (2) a zero dollar transaction where the consumer is authenticated, authorized and registered in one step. For example, a zero dollar authorization message including a PIN (provided by the consumer using the consumer's mobile device) and the account details may be sent to the issuer 114. The issuer 114 can authenticate, authorize and register the consumer in one step.

One or more of the following may happen when the consumer 102 completes the registration process: (1) mobile phone number and the card/account details can be stored in a database associated with the card-on-file service 110; (2) registration eligibility checks are verified by the service manager 106 (e.g. number of payment accounts/phones registered); and (3) a shared secret between the cardholder and the system can be created.

In embodiments of the invention, the shared secret can be used to gain consumer confidence that the system requiring authentication is genuine and is not fraudulent. The consumer may choose to or be provided with the shared secret at the time of registration, and in some embodiments, the shared secret may be in the form of an image (e.g., photo, bar code, QR code, etc.) or text (e.g., a secret message).

In some embodiments of the invention, the issuer 114 may provide a financial key/financial key pair (e.g., issuer key/issuer key pair provided by an issuer) to a mobile network operator (MNO). In one embodiment, the financial key/financial key pair or issuer key/issuer key pair used for performing a transaction may be a Derived Unique Key Per Transaction (DUKPT) key/key pair that is unique for each transaction. In such embodiments, an algorithm and/or a master key provided by the issuer 114 for generating the issuer DUKPT keys can be installed on new SIM cards at the point of manufacture. The issuer key pair can be stored at the issuer 114 that may be used for decryption. In one embodiment, a participating MNO may provide transport key/transport key pair for encryption/decryption of data between various participants in the system 100. In some embodiments, the issuer keys may be stored at the service manager 106, authentication channel 108 or the acquirer 112. Additionally or alternatively, transport keys provided by the MNO can be installed in the SIM at the point of manufacture, and the transport key pair may be provided to the authentication channel 108 (or potentially other system participant). The authentication channel 108 and other entities (e.g. the service manager 106) can share other communications keys.

In one embodiment of the invention, the PIN can be first encrypted into a PIN block with an issuer key of the issuer key pair. The issuer encrypted PIN block can then be further encrypted with a transport key of the MNO transport key pair using an encryption algorithm such as 3DES (e.g., Triple Data Encryption Algorithm). The authentication channel 108 can decrypt the still encrypted PIN block with the other transport key of the MNO transport key pair provided by the MNO. The authentication channel 108 can re-encrypt the still encrypted PIN block with the authentication channel 108 or service manager 106's encryption keys and send it to the acquirer 112/payment gateway via the service manager 106. The acquirer 112 can decrypt the still encrypted PIN block with the corresponding authentication channel 108 or acquirer 112 key and can submit transaction for authorization. The issuer 114 can decrypt the issuer encrypted PIN block with the other issuer key of the issuer key pair and authenticate and authorize the transaction.

A process flow can be described with respect to FIG. 1, in one embodiment of the invention.

In step 1, a transaction can be initiated by a consumer or a merchant using one of the transaction initiation channels as specified by the transaction initiation channel provider 104. In one embodiment, the consumer 102 may initiate a transaction using the consumer's mobile phone number via a POS terminal, mobile application or portal, PC/Internet portal, IVR, SMS or USSD messages, a phone call to the merchant, mobile POS, etc. For example, the consumer 102 may initiate a transaction with a POS terminal in a brick and mortar store. The merchant can enter the consumer 102's mobile phone number into a physical POS terminal or a mobile POS terminal. As another example, the consumer 102 may use a mobile application on the consumer's mobile device and initiate a transaction on a merchant website.

In step 2, the transaction initiation channel provider 104 may provide the service manager 106 with the transaction details via the communication channel 120. For example, the transaction details may include the consumer's mobile phone number, a transaction amount, card type, merchant identifier, etc. In some embodiments, the transaction details may include geo-location data, time and date of the transaction, items purchased, etc.

In step 3, the service manager 106 may transmit the consumer 102's mobile phone number (and some of the payment related details) to the authentication channel 108 via the communication channel 122.

In step 4, the authentication channel 108 may request that the cardholder confirm/authenticate the transaction on their mobile device. For example, the authentication channel 108 may initiate an authentication request message to the consumer's mobile device requesting to enter a personal identifier. If the consumer 102 has multiple payment accounts registered with the mobile device, the consumer 102 may be asked to select a payment account for the current transaction. In one embodiment, the authentication request message from the authentication channel provider 108 may contain a shared secret. For example, the shared secret may include a photo or text that may have been registered previously.

In step 5, the consumer 102 may confirm the transaction by entering their personal identifier (e.g., card PIN or a biometric identifier) and send it to the authentication channel 108 in a secure manner. For example, the cardholder may enter their card PIN into their registered mobile device. In one embodiment, the card PIN may be encrypted on the consumer's mobile device. For example, the card PIN may be first encrypted on the consumer's mobile device using an issuer key (e.g., issuer DUKPT key) of the issuer key pair into a PIN block and then a transport key (e.g., MNO transport key) of the transport key pair.

In step 6, the authentication channel 108 may send the cardholder's mobile number and the personal identifier to the service manager 106. In one embodiment, the authentication channel 108 may first decrypt the encrypted PIN with the other transport key (e.g., MNO transport key pair) of the transport key pair and then re-encrypt the still encrypted PIN block with an authentication channel 108-service manager 106 key before sending to the service manager 106.

In step 7, the service manager 106 may communicate with the COF service 110 to translate the cardholder's mobile phone number to the payment account details. For example, the COF service 110 may utilize the phone-card database to retrieve the payment account details (e.g., personal account number, expiration date, etc.) associated with the cardholder's mobile phone number. In some embodiments, the payment account details may include the consumer's personal identifying information such as consumer's name, address, date of birth, etc.

In step 8, the COF service 110 may provide the service manager 106 with the payment account details.

In step 9, the service manager 106 may send the transaction details and the payment account details along with the encrypted PIN to the acquirer 112/payment gateway for processing.

In step 10, the acquirer 112/payment gateway may create an authorization request message and send it to the issuer 114 via the payment processing network 116 such as Visanet®. In one embodiment, the authorization request message may include the payment account details (e.g., payment account number), transaction details and the encrypted PIN. In one embodiment, the acquirer 112 can decrypt the still encrypted PIN block with the corresponding authentication channel 108 key and provide the issuer encrypted PIN block to the issuer 114. The payment processing network 116 may also be characterized as a financial switch in some embodiments.

In step 11, the issuer 114 may process the authorization request message and send an authorization response message to the acquirer 112. For example, the authorization request message may include a payment account number and the corresponding personal identifier (PIN). The issuer 114 may authenticate and authorize the transaction in one combined step as compared to prior approaches where the consumer may be authenticated and authorized using different processes. The authorization response message may include an authorization indicator whether the transaction was approved (e.g., a positive authentication result) or declined (e.g., a negative authentication result). In one embodiment, the issuer 114 may first decrypt the PIN block using the other issuer key of the issuer key pair before matching the PIN with the stored PIN associated with the consumer's payment account.

In step 12, the acquirer 112/payment gateway may pass the authorization response details to the service manager 106.

In step 13, the service manager 106 may inform the authentication channel 108 of the authorization response. In one embodiment, if the authorization response includes a negative authentication result, the service manager 106 may update the consumer record in the COF service 110 that may be used for risk assessment for later transactions.

In step 14, the service manager 106 may inform the merchant associated with the transaction initiation channel provider 104 of the authorization result. In one embodiment, if the authorization response includes a negative authentication result, the merchant may ask the consumer 102 to provide the personal identifier again.

In step 15, the authentication channel 108 may inform the consumer 102 of a successful or a declined transaction. For example, the consumer 102 may receive a text (e.g., SMS or USSD message), or an email on their registered mobile device via the communication channel 124. In one embodiment, a summary of the transaction may be provided to the consumer's mobile device via the mobile application.

Authentication Using a Wallet Provider Application

Figure 2:
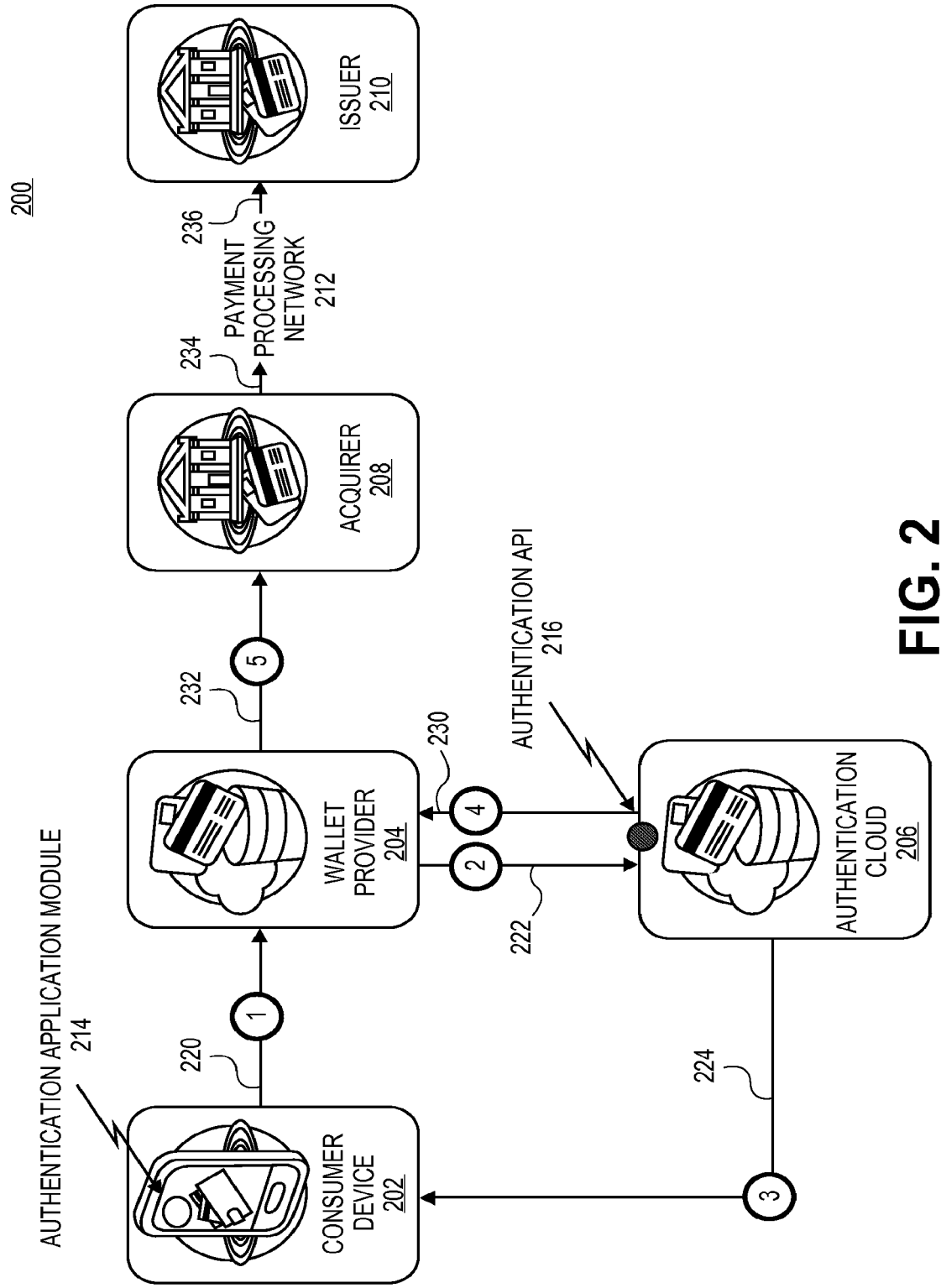
FIG. 2 shows at least some components of a system that may be used to enable card PIN authentication via a wallet provider, in one embodiment of the invention.

FIG. 2 shows at least some components of a system 200 that may be used to enable card PIN authentication via a wallet provider, in one embodiment of the invention.

The system 200 may include a consumer device 202, a wallet provider 204, an authentication cloud 206, an acquirer 208, an issuer 210 and a payment processing network 212. The circled numbers represent the order of part of a process flow in one embodiment; however, other process flows or other order of the process may be implemented in the system 200. Note that each of the wallet provider 204, authentication cloud 206, acquirer 208, issuer 210 and the payment processing network 212 may be associated with a computer apparatus, similar to the one described with reference to FIG. 10. Each of the entities in FIG. 2 may utilize one or more communication channels to send and/or receive messages. In one embodiment, entities communicating with each other can share communications keys. For example, a communication key of a key pair may be held at a first entity and a corresponding communication key of the key pair may be held at a second entity. Some components of the system 200 are described in further detail below.

The consumer device 202 may be configured to enable a consumer to conduct transactions. Some non-limiting examples of the consumer device 202 may include a mobile device (e.g., mobile phone, notebook, tablet, PDA, personal music player, etc.), a personal computer, a payment device (e.g., payment card, etc.) or any suitable device that may be utilized to initiate a transaction and/or provide a response (e.g., a PIN and/or a challenge response) to an authentication request. In one embodiment, the consumer may use a particular consumer alias (e.g., a mobile number, an alphanumeric value, etc.) registered with the wallet provider 204 to initiate the transaction. In one embodiment, a consumer may use the consumer device 202 to register their personal and payment account details with the wallet provider 204 and/or an authentication cloud 206. In cases where a consumer uses a mobile device to enter a PIN, it may be desirable to have the consumer's mobile device provide a level of security that is similar to a PED (Pin Entry Device) compliant pin-pad.

Transactions can be initiated with a mobile phone number or a mobile phone number barcode. Consumer initiated transactions can be conducted using a mobile application/mobile internet, IVR system, SMS/USSD messages, and PC/internet. Merchant initiated transactions may be initiated via a mobile application/mobile internet, IVR system, SMS/USSD messages, Personal Computer/internet portal, mobile POS, in-store POS (for face to face purchases or money transfers), and remote POS (for phone purchases or money transfers). In other embodiments, there can be designated consumers who perform a transaction on behalf of an account holder. For example, in embodiments of the invention, a family member may initiate a payment at a POS terminal instead of a primary account holder.

In one embodiment, a transaction can be initiated using a mobile application executing on a mobile device. In one embodiment, the mobile application may include an authentication application module 214 and may be associated with the wallet provider 204. The consumer can execute the wallet provider's mobile application on a mobile device, select goods, and initiate the check-out process using the same consumer alias as registered with the wallet provider. If multiple payment accounts are registered with a wallet provider, the consumer can select a payment account for the transaction. The consumer may receive an authentication request message via the authentication application module 214. In one embodiment, the authentication request message may contain a summary of the transaction details and a shared secret. The consumer can authenticate the transaction by entering the consumer's card PIN. In some embodiments, where VbV® (Verified-by-Visa) service is used for mobile application transaction initiation, the use of VbV® password can be preserved by providing a secure way of allowing the consumer to enter their VbV® password.

In one embodiment, a transaction can be initiated by the consumer using a PC or mobile Internet. The consumer may select goods at the wallet provider's online website and initiate the check-out-process with the same consumer alias as registered with the wallet provider. If multiple payment accounts are registered with a wallet provider, the consumer can select a payment account for the transaction. The consumer may receive an authentication request message via the authentication application module 214. The authentication request may contain a summary of the purchase details and a shared secret. The consumer can authenticate the transaction with their card PIN.

In one embodiment, a transaction can be initiated using a merchant dedicated application. The merchant or the consumer can enter a merchant dedicated application, enter a payment amount, and generate a one-time barcode or QR code containing transaction related data. The consumer can scan the barcode using a mobile application and initiate a transaction. Alternatively, the merchant or the consumer can enter the payment amount and the consumer alias or phone number in the merchant application. The consumer may receive an authentication request message via the authentication application module 214 or a standalone payment application. The authentication request message may contain a summary of the transaction details and a shared secret. The consumer can authenticate the transaction by entering the consumer's card PIN.

In one embodiment, a transaction initiation can be performed by the consumer using a personal computer or mobile Internet. The consumer can select goods at an online merchant website and check out by entering their phone number or consumer alias. The consumer may receive an authentication request within the authentication application module 214 or other standalone application. The authentication request may contain a summary of the transaction details and a shared secret. The consumer can authenticate the transaction with their card PIN.

In one embodiment, a transaction can be initiated by the consumer calling the merchant. The merchant can enter the payment amount and the consumer's mobile number into a portal or into a POS terminal (physical or mobile) with compatible software. The consumer may receive an authentication request within the authentication application module 214 or other standalone application. The authentication request may contain a summary of the transaction details and a shared secret. The consumer can authenticate the transaction with their card PIN.

In some embodiments, a transaction can be initiated via IVR, MOTO (Mail-Order Telephone-Order), POS/in-store or any applicable channel supported by the Wallet Provider. Embodiments of the invention can have the potential to support barcode or QR code based front-ends to avoid consumers needing to provide merchants with their phone number. Further, embodiments of the invention can have the potential to facilitate card-less money transfer (MT) transaction initiation/receipt at POS/ATM.

In one embodiment, a wallet provider associated with a payment processing network (e.g., V.me by Visa®) can use embodiments of the invention to provide authentication services to verify a consumer when they are setting up an account with the wallet provider. In some embodiments, a real-time risk scoring service may be used to allow intelligent suppression of the consumer's PIN for low value and low risk transactions. For example, for low value and low risk transactions (e.g., based on the low risk merchant category codes), the consumer may not be requested to provide a PIN or another identifier after the consumer's first successful transaction. In some embodiments, a wallet provider may need to provide the merchant category code and any other relevant data to the authentication cloud 206 so that the authentication cloud 206 may determine if an authentication request message needs to be generated.

Referring back to FIG. 2, the wallet provider 204 may be configured to connect with various merchants/merchant billing systems, as well as the authentication cloud 206, via one or more authentication APIs. The end merchant may be a wallet provider, or a merchant that may be aggregated by a wallet provider. The wallet provider 204 may be associated with a wallet server computer or a merchant server computer. In embodiments of the invention, the wallet provider 204's transaction initiation interface (e.g., mobile application, website) may enable the consumer to initiate transactions with their mobile phone number. In one embodiment, the wallet provider 204 may also provide the authentication application module 214 to enable the consumer to input their card PIN via a certified Software Development Kit (SDK). The wallet provider 204 may be further configured to facilitate the transfer of data (e.g., consumer alias/phone number/card data such as a payment account number, expiration date, etc.) to the authentication cloud 206 via an authentication API 216. The wallet provider 204 may also be configured to submit to the issuer 210 an authorization request message that may contain the payment account number, encrypted card PIN and a digital certificate.

In one embodiment, the wallet provider 204 may send consumer's personal and payment details (e.g., consumer alias, mobile phone number, payment account number, etc.) to the authentication cloud 206 to commence the authentication process. The authentication cloud 206 may respond with the data necessary (e.g., payment account details, personal identifier, mobile phone number, etc.) for the wallet provider 204 to submit the transaction for authorization. The wallet provider 204 may submit the transaction for authorization via the existing acquirer/processor (e.g., the acquirer 208). The wallet provider 204 may send a notification message to the cardholder indicating the status of the cardholder's transaction. The notification may be delivered electronically (e.g., to the consumer device 202) and may contain any one or more of a transaction amount, a transaction date and time, a transaction type, a truncated primary account number (PAN) reference, a transaction reference, a transaction result and a merchant identification. In one embodiment, the wallet provider 204 may store payment notification or associated transaction information in a log file for future retrieval in response to cardholder transaction queries.

In one embodiment, the wallet provider 204 may connect to the authentication cloud 206 via defined APIs and using digital certificates. In one embodiment, the connection may only be granted if the wallet provider 204 has been successfully tested and certified with the payment processing network 212 associated with the authentication cloud 206. In one embodiment, the acquirer 208 associated with the wallet provider 204 may be configured to support capabilities to initiate refunds and reversals.

The payment accounts can be registered individually or in bulk by the wallet provider 204. In one embodiment, one consumer alias can support multiple payment accounts. In one embodiment, one account number can be registered against multiple consumer aliases. In one embodiment, the wallet provider 204 can provide alias/payment account information to authentication cloud 206 at launch of the wallet provider application.

The authentication cloud 206 may be configured to receive transaction details for a transaction conducted by consumer 202 using an account associated with the issuer 210. The authentication cloud 206 may be configured to initiate an authentication request message to the consumer device 202 before communicating with the issuer 210. The authentication cloud 206 may further be configured to receive a personal identifier from the consumer device 202 before communicating with the issuer 210. By allowing the consumer to provide the personal identifier for authentication via the consumer device 202 and authenticating the personal identifier before communicating with the issuer 114 may provide an improved process flow for authorizing a transaction. For example, if the personal identifier is not authenticated, an unauthorized transaction can be stopped before a transaction authorization request message for the unauthorized transaction is generated. This can prevent a transaction request message for an unauthorized transaction from being propagated throughout the payment processing system, and can reduce wasted computing resources and network traffic for processing such an authorized transaction. Additionally, authentication using the card PIN entered via the consumer device 202 can provide payment liability shift for the wallet providers since, in some cases, the wallet providers may have to bear the costs of unauthorized transactions. The authentication cloud 206 may be configured to initiate the sending of an authorization request message comprising a payment account number associated with the issuer 210 after receiving the personal identifier from the consumer device 202. In one embodiment, initiating the sending of the authorization request message may include generating the authorization request message comprising the account identifier and the personal identifier and providing the authorization request message to the wallet provider 204.

In one embodiment, the authentication cloud 206 may be configured to match the personal identifier provided by the consumer against a previously stored personal identifier for the consumer and may generate an authentication indicator indicating a positive authentication result if there is a match. In some embodiments, the authentication indicator may be a binary value (e.g., can take on a value of 1 or 0) indicating whether the authentication is successful or not. If the personal identifier didn't match with the previously stored personal identifier for the consumer then the authentication indicator may indicate a negative authentication result. In one embodiment, the authentication cloud 206 may provide the personal identifier and/or the authentication indicator to the wallet provider 204.

The authentication cloud 206 may be configured as a centralized core system that can connect into various wallet providers via APIs. The authentication cloud 206 may include an authentication server computer. In one embodiment, the authentication cloud 206 may be configured to facilitate the storage of card holder data, identity federation, key management, and digital certificate generation to provide the wallet provider 204 with a liability shift. For example, the authentication cloud 206 may be able to federate consumer information from and/or to any third party connecting to the authentication cloud 206 based on the mobile phone number.

The authentication cloud 206 may also be configured to generate a transport key/transport key pair and may store one or more consumer aliases, phone numbers, account identifiers (e.g., Primary Account Numbers (PAN)), and other details (e.g., address) associated with a consumer. In one embodiment, the transport key/transport key pair may be provided to the authentication cloud 206 by the payment processing network 212. In one embodiment, an issuer key of an issuer key pair can be used to encrypt the card PIN before sending to the issuer 210. In one embodiment, the issuer key/issuer key pair (e.g., issuer DUKPT key/key pair) may be provided by the issuer. The authentication cloud 206 may be configured to decrypt the PIN or the personal identifier with the transport key and re-encrypt with a first financial key issued by the issuer 210. In one embodiment, a digital certificate can be generated in order to provide the wallet provider 204 with a liability shift and to verify that the authentication cloud 206 authenticated the consumer. In one embodiment, the digital certificate may be generated using a derivative of the CAVV (Cardholder Authentication Verification Value) that may be used by some issuers for other authentication processes such as VbV®. The authentication cloud 206 may be configured to generate a digital certificate/CAVV, for any transaction; however, in some embodiments, the liability shift may be possible only with a positive authorization based on the digital certificate/CAVV, card number and the card PIN. The authentication cloud 206 may be configured to accept a derivative of the issuer CAVV keys in a scalable manner. For example, the authentication cloud 206 may accept issuer keys which may be derived from the issuer CAVV keys. The validity of the digital certificate can be checked during authorization, either via the issuer 210 or the payment processing network 212 delegated with such a task.

In one embodiment, the authentication cloud 206 may be configured to provide the functionalities of the authentication channel 108 and the service manager 106 as discussed with reference to FIG. 1. In one embodiment, the COF service 110 may be associated with the authentication cloud 206 or the wallet provider 204 for storage of the cardholder data.

The acquirer 208 may be similar to the acquirer 112. The acquirer 208 may be configured to route the authorization request message for a transaction to the issuer 210 via the payment processing network 212.

The issuer 210 may be associated with a business entity (e.g., a bank) that may have issued the payment (credit/debit) card, account numbers or payment tokens used for payment transactions conducted using the consumer device 202. In one embodiment, the issuer 210 may need to provide the payment processing network 212 with a derivative of their VbV® keys so that the payment processing network 212 can generate a digital certificate and recognize the transaction type. In one embodiment, the issuer keys may be provided via a traditional process. The issuer 210 may be configured to process the transaction based on the new information carried in the authorization message, e.g., digital certificate, encrypted card PIN, etc. In some embodiments, the business entity (bank) associated with the issuer 210 may also function as an acquirer (e.g., the acquirer 208). The issuer 210 may be associated with an issuer computer.

The payment processing network 212 may be configured to provide authorization services, and clearing and settlement services for payment transactions. The payment processing network 212 may include data processing subsystems, wired or wireless networks, including the internet. An example of the payment processing network 212 includes VisaNet®, operated by Visa®. In some implementations, the payment processing network 212 may interact with applications running on the consumer device 202. The payment processing network 212 may include a server computer.

In one embodiment, the authentication cloud 206 may store a card number, an expiration date, a consumer alias associated with a wallet provider, a transport key, an international format mobile number, a shipping address, a shared secret, authorization data for each transaction, and authorization response data for each transaction. Additionally, a merchant category code (MCC), a merchant identifier (MID), and any other information relating to a risk score may be stored.

In one embodiment, the service provided by the authentication cloud 206 can leverage existing services provided by a payment processing network (e.g., the payment processing network 212) having data storage capabilities, such as, device fingerprinting data, and transaction authentication without invoking VbV®.

For low value and low risk transactions (e.g., from low risk MCCs (Merchant Category Codes)), the authentication cloud 206 may omit the requirement of the consumer having to enter their card PIN after the first successful transaction. In some embodiments, this may require the wallet providers to additionally provide an MCC value (and potentially other data) to the authentication cloud 206.

In one embodiment, the authentication cloud 206 may be able to federate consumer information (i.e., identity federation) from and/or to any third party connecting to the authentication cloud 206 based on the mobile phone number. In this case, consumers may not be required to register when they visit other third parties. If a consumer is attempting to initiate a transaction from a new wallet provider or merchant that does not have the consumer's payment account number on file, the wallet provider or merchant may be given the option to check if the authentication cloud 206 has payment account data associated with the consumer's mobile number. If the payment account and phone data are determined to be associated with each other, the consumer may be given the option to continue payment with the particular payment account that will be identified with the last four digits of the account number. If the payment account/phone data is not associated, the consumer may be requested to enter their payment account details and register in the standard manner.

In one embodiment, a transport key/transport key pair can be used by the wallet provider 204 and the authentication application module 214 to encrypt the card PIN from the consumer device 202 provided to the authentication cloud 206. The transport keys may be provided by the payment processing network 212 and can be stored in the consumer device 202, authentication cloud 206 and/or the subscriber identity module (SIM) of the consumer's mobile device.

A transaction flow using the system 200 in FIG. 2 can be described as follows:

In step 1, a transaction can be initiated by the consumer via the wallet provider 204's mobile application on the consumer device 202 (mobile device or personal computer). The checkout process may use the consumer's alias that is used at the particular wallet provider (e.g., mobile number, alpha-numeric value). Note that if the wallet provider 204 has not registered the consumer's alias against a payment account, the consumer may be prompted to enter their payment account details. The consumer may be provided with the ability to select payment accounts via the wallet provider 204's interface. The transaction may be conducted by the consumer using an account issued by the issuer 210.

In step 2, the wallet provider 204 may send the transaction details including one or more of consumer's alias, mobile phone number, and the payment account details to the authentication cloud 206. If consumer's alias/mobile phone number/payment account details combination is new, the authentication cloud 206 may save the details. In some embodiments, the wallet provider 204 may provide the alias/payment account information at launch of the wallet provider application and for every transaction to the authentication cloud 206.

In step 3, the authentication cloud 206 may activate the consumer's authentication application module 214 and may install a first transport key of a transport key pair on consumer device 202 if the consumer is new. The authentication cloud 206 may initiate an authentication request message 224 to the consumer device 202 before communicating with the issuer 210. A shared secret may be displayed on the consumer device 202 and the consumer may be requested to enter their card PIN, which may be encrypted with the first transport key. In one embodiment, the shared secret may be generated and managed by the payment processing network 212.

In step 4, the card PIN may be received by the authentication cloud 206, which may perform additional encryption and/or decryption of the card PIN using the transport keys and/or the issuer keys. In one embodiment, the authentication cloud 206 may automatically generate a digital certificate from a third financial key (e.g., VbV® CAVV keys) provided by the issuer 210. For example, the card PIN may be decrypted by a second transport key of the transport key pair, and may be re-encrypted with the a first issuer key of an issuer key pair. The authentication cloud 206 may forward the consumer alias, payment account details, re-encrypted PIN and the digital certificate to the wallet provider 204. In one embodiment, the authentication cloud 206 may determine that the personal identifier matches a previously stored personal identifier for the consumer and may generate an authentication indicator indicating a positive authentication result. If the personal identifier didn't match with the previously stored personal identifier for the consumer then the authentication indicator may indicate a negative authentication result. The authentication indicator may be provided to the wallet provider 204 in the message 230 along with the transaction details. For the negative authentication result, a message to the consumer device 202 may be sent informing of the failed authentication. In one embodiment, the consumer may be asked to re-enter the PIN or provide another personal identifier.

In step 5, the wallet provider 204 can submit the transaction for processing via the acquirer/payment gateway for a positive authentication result. For example, the wallet provider may send an authorization request message 232 including the transaction details, payment account details (e.g., payment account number, expiration date, etc.), card PIN and the digital certificate to the acquirer 208. In one embodiment, the wallet provider 204 may send the authorization request message comprising the account identifier, and the personal identifier or the authentication indicator to the acquirer 208. The acquirer 208 may forward the message 232 to the payment processing network 212, which may forward it to the issuer 210. The issuer 210 may authorize the transaction if the payment account number, expiration date, card PIN, and the digital certificate are correct. The issuer 210 may decrypt the encrypted PIN with the second issuer key of the issuer key pair to obtain the unencrypted PIN. This PIN may be compared with a PIN that was previously stored by the issuer 210. The wallet provider 204 may then forward a conformation message to the consumer and the authorization response data to the authentication cloud 206. The authorization response data can be used by the authentication cloud 206 to show that the payment account/phone combination is valid and can be used or be federated elsewhere.

In the above-described method and other methods described herein, encryption/decryption can be performed using any suitable known encryption algorithm/process including DES (e.g., 56 bits), 3DES (e.g., 168 bits), AES (e.g., 128 bits), etc. In some embodiments, asymmetric keys may be used for encryption such as RSA, ECC, SHA, etc. The steps 1 to 5 are described in further details with reference to the flowchart of FIG. 5.

Figure 3:
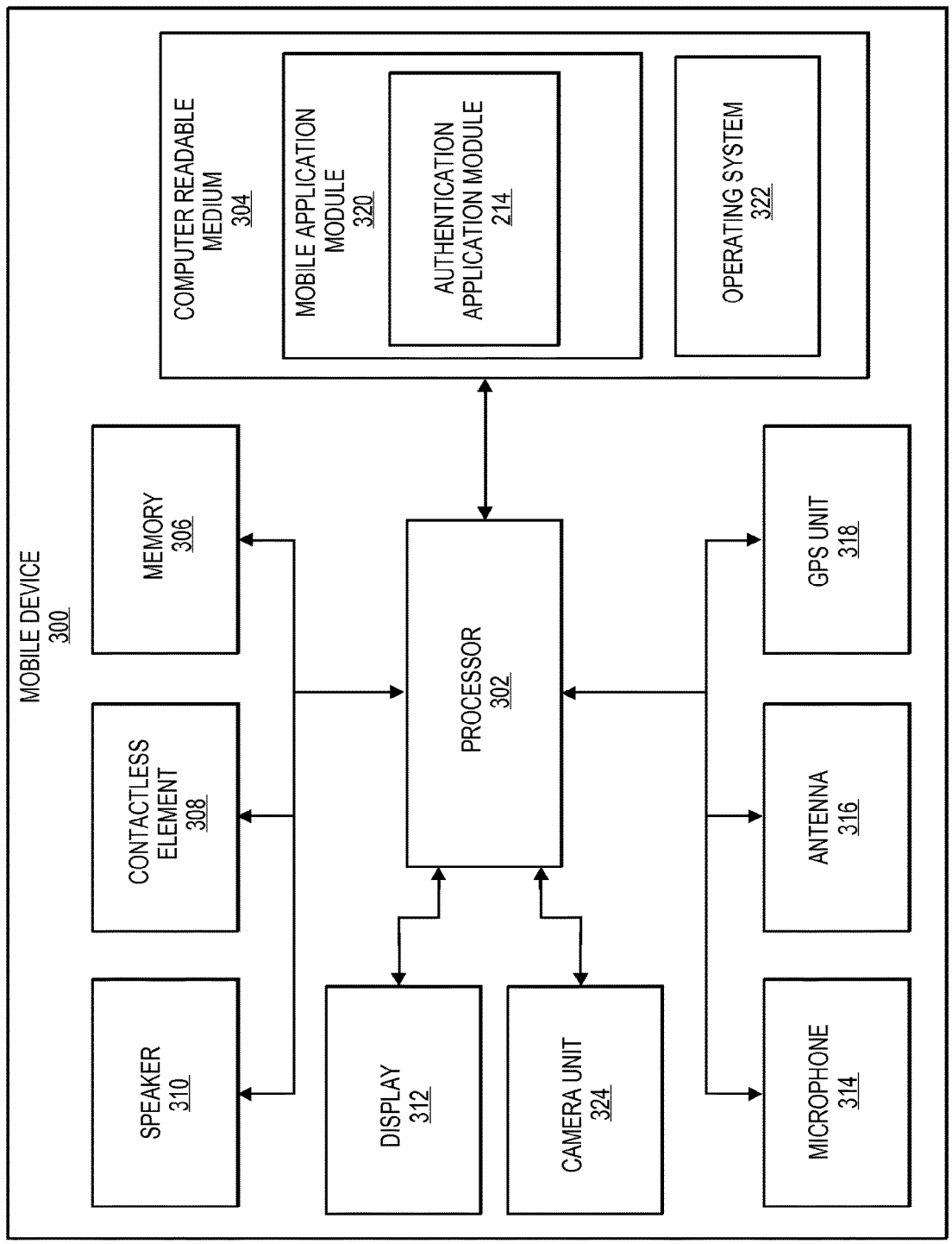
FIG. 3 illustrates at least some components of a mobile device, in one embodiment of the invention.

FIG. 3 illustrates at least some components of a mobile device 300 that can be used as the consumer device 202, in one embodiment of the invention.

The mobile device 300 may include a computer readable medium 304, a memory 306, a contactless element 308, a speaker 310, a display 312, a microphone 314, an antenna 316, a GPS unit 318 and a camera unit 324 and these may all be operatively coupled to a processor 302.

The mobile device 300 may be a mobile phone, a tablet, a PDA, a notebook, a laptop or any such electronic device capable of communicating and transferring data and/or control instructions via a wireless network (e.g., cellular network, internet, etc.) and short range communications. For example, the mobile device 300 may be a smart phone that can allow the consumer to enter a PIN without using any other device (e.g., via an application on mobile device 300). The mobile device 300 may also allow a consumer to download, install and execute applications on the mobile device 300. The mobile device 300 may also be configured as a payment device that may be used to conduct financial transactions such as purchases, money transfer, etc.

The CRM 304 may comprise code executable by the processor 302 for implementing methods using embodiments of the invention. The CRM 304 may be in the form of a memory that can store data and could be internal to the mobile device 300 or hosted remotely (i.e., cloud) and accessed wirelessly by the mobile device 300. In some embodiments, the CRM 304 may include non-volatile, non-writable storage area (e.g., Flash ROM) where the firmware/operating system may reside. The CRM 304 may also include programmable storage area. The CRM 304 may include an operating system 322 and a mobile application module 320 comprising the authentication application module 214. The mobile device 300 may be configured to enable a consumer to conduct transactions using the mobile application module 320.

The memory 306 may include RAM where volatile runtime memory may reside (e.g., a cache). The contactless element 308 may be capable of transmitting and receiving wireless data and/or instructions using a short range wireless communications capability (e.g., Near Field Communications).

In some embodiments, the mobile device 300 may include a secure element (not shown) for storing/executing secure applications (e.g., a wallet application) and storing data (e.g., cryptographic data for key management, Personal Account Information, Personal Identification Information, etc.). The secure element may be implemented using a separate secure chip, such as a smart card chip, embedded in the mobile device 300 as a standalone chip or coupled with the contactless element 308. The secure element may also be implemented in a SIM/UICC card, or in an SD card that can be inserted in the mobile device 200.

The display 312 may be used to see messages, images, and other information. In some embodiments, the display 312 may also be configured as a touch screen for the consumer to input or select information, for example, to enter a PIN, another identifier or a challenge response using a touch screen interface. In one embodiment, the touch screen interface of the display 312 may be used to sense the consumer's fingerprints that may be used for biometric authentication of the consumer. Alternatively, a separate finger print sensor may be included in the mobile device 300. The speaker 310 may be used by the consumer to hear voice communication, music, etc., and the microphone 314 may be used by the consumer to transmit audio (e.g., voice) through the mobile device 300. In one embodiment, the microphone 314 may be used to record and/or detect the consumer's voice that may be used for biometric authentication of the consumer. The antenna 316 may be used for wireless data transfer to and from the mobile device 300. It will be understood that the mobile device 300 may also include other elements such as a camera, a keypad, a mouse, etc. to support other functionalities. In one embodiment, a consumer may utilize a keypad to provide a PIN or another identifier in response to an authentication request.

The GPS unit 318 may be configured to detect a location of the mobile device 300 using a Global Positioning System. Note that any location detection method may be used in place of or in addition to the GPS unit 318. For example, the location of the mobile device 300 may also be determined using network based positioning (e.g., using the antenna 316 coupled to the mobile device 300) or a hybrid positioning system. In one embodiment, a network based positioning system may utilize a service provider's network infrastructure to identify the location of the mobile device 300. Some other non-limiting examples to determine the device location may include handset based, SIM-based or WiFi based device tracking.

The camera unit 324 may be configured to take a picture or a video. For example, the camera unit 324 may be used to take a consumer's photo or facial expressions which may be used for biometric authentication of the consumer.

In some embodiments of the invention, information related to the geo-location data of the mobile device 300 at the time of a transaction conducted by a consumer may be used in a number of ways. In one embodiment, depending on the location of the merchant (e.g., for a physical POS transaction) along with the detected location of the consumer, the transaction may be determined as a consumer present transaction, and accordingly appropriate risk parameters may be applied for authentication of the transaction.

The mobile application module 320 may be configured to enable a consumer to conduct financial transactions such as purchases, money transfer, etc. In one embodiment, the mobile application module 320 may be provided by the wallet provider 204 that may allow the consumer to select the goods/services for purchase. The mobile application module 320 may be further configured to enable the consumer to initiate a payment with a consumer alias or a mobile phone number. If the consumer hasn't registered an account number with the consumer alias/phone number, then the consumer may be requested to register the account with the consumer alias/phone number via an interface provided by the mobile application module 320. In one embodiment, the consumer can only authenticate transactions from their registered consumer device or mobile application.

In one embodiment, the authentication application module 214 can be integrated into the wallet provider's mobile application (e.g., mobile application module 320) via a software development kit that can provide a secure channel for the consumer to enter their card PIN or another personal identifier. The authentication application module 214 may be configured to connect securely to the authentication cloud 206 when the security between the various components has been established. The authentication application module 214 may be configured to allow the consumer to receive a summary of the transaction and securely enter their card PIN. In one embodiment, the authentication application module 214 can include transport keys and can be designed to be portable across multiple operating systems. In one embodiment, the authentication application module 114 may be stored and executed in a secure environment, e.g., a secure element or in a trusted execution environment.

In one embodiment, the authentication SDK may be supported by a developer program, test environment and certification service. In one embodiment, the authentication application module 214 can only be activated when certain checks are carried out to establish that the wallet provider 204 is a trusted provider, and the security of the environment in which the authentication application module 214 may be operating. In one embodiment, the wallet provider 204 may need to comply with security requirements associated with the payment processing network 212 in order for the application module 214 to be integrated with the wallet provider application. If the consumer has downloaded the authentication application module 214 via one wallet provider, the authentication application module 214 can be made available to other wallet providers (and merchants). The authentication application module 214 can be configured to be portable across various operating systems and can provide the same consumer experience and security across different operating systems.

The operating system 322 may be a collection of software that can manage computer hardware resources and can provide common services for applications. The operating system 322 may be configured to enable the installation and execution of applications on the mobile device 300.

Figure 4:
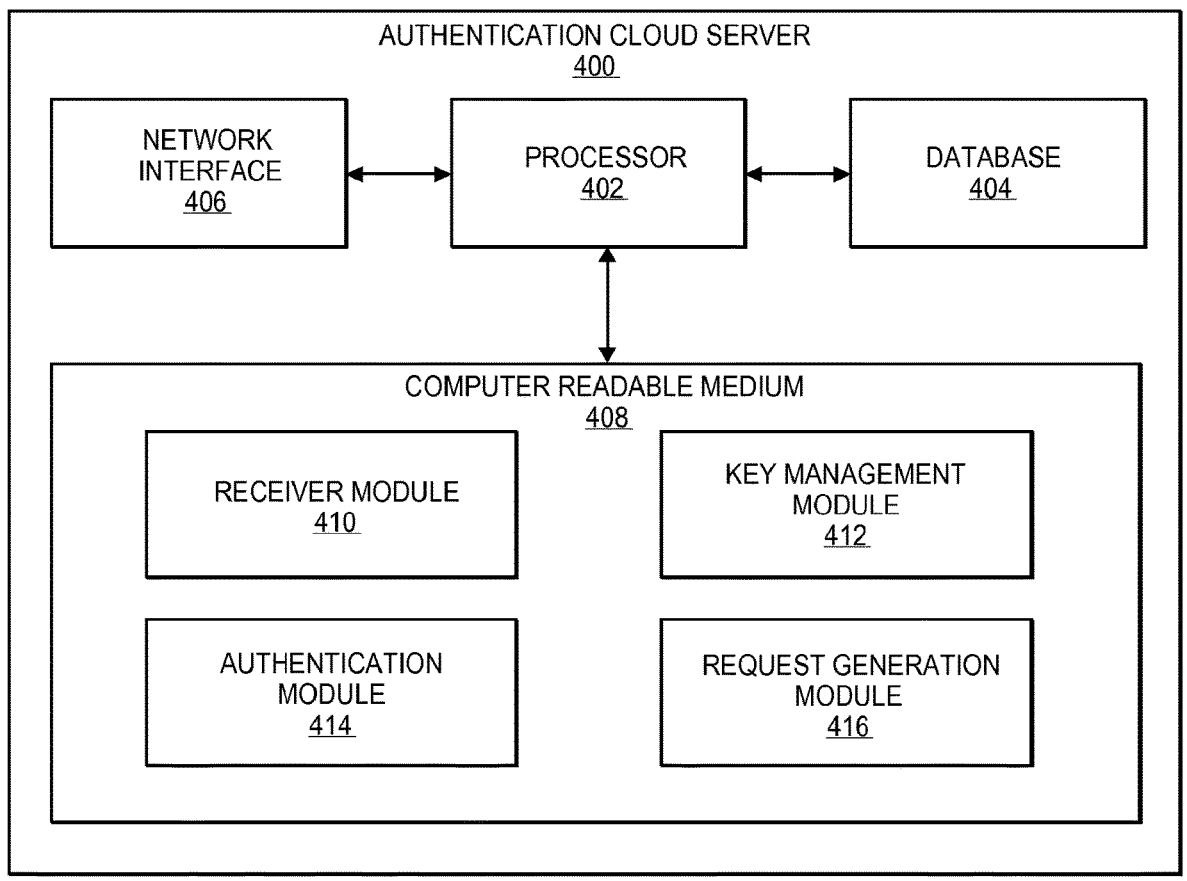
FIG. 4 illustrates at least some of the components of an authentication server computer, in one embodiment of the invention.

FIG. 4 illustrates at least some of the components of an authentication server computer 400, in one embodiment of the invention.

The authentication server computer 400 may be associated with the authentication cloud 206. The authentication server computer 400 may include a processor 402 communicatively coupled to a database 404, a network interface 406 and a computer readable medium 408.

The network interface 406 may be configured to communicate with the consumer device 202, the wallet provider 204 and other entities (not shown) using one or more communications networks.

The database 404 may be coupled to the processor 402 internally as part of the authentication server computer 400 or externally (e.g., via cloud based data storage). The database 404 may be configured to securely store a consumer's personal and financial information and information associated with transactions initiated by the consumer. For example, the database 404 may store an account identifier or a payment account number, expiration date, consumer alias associated with a wallet provider, transport key, mobile phone number, shipping address, shared secret, etc. In one embodiment, the database 404 may store data associated with the authorization request and authorization response per transaction for each consumer. In some embodiments, a merchant category code, a merchant ID and any other information suitable to determine a risk score may also be stored in the database 404. In some embodiments, cryptographic keys such as transport key/transport key pair and issuer key/issuer key pair may be stored in the database 404 or a secure memory that may be communicatively coupled to the processor 402.

The computer readable medium (CRM) 408 may be in the form of a memory (e.g., flash, ROM, RAM, etc.) and may comprise code, executable by the processor 402 for implementing methods described herein. For example, the computer readable medium 408 may include code implementing a receiver module 410, a key management module 412, an authentication module 414, and/or a request generation module 416.

The receiver module 410 may be configured to receive transaction details for a transaction conducted by a consumer. For example, the consumer may utilize the consumer device 202 to initiate a transaction using an account associated with the issuer 210. The receiver module 410 may also be configured to receive a personal identifier from the consumer device 202 in response to the consumer device 202 receiving an authentication request message.

The key management module 412 may be configured to manage the transport keys for encryption/decryption of the personal identifier provided by the consumer and also the financial keys provided by the issuer 210. In one embodiment, the key management module 412 may be configured to install a first transport key on the consumer device 102 when the authentication application module 214 is first activated on the consumer device 102. The key management module 412 may also be configured to decrypt the encrypted personal identifier using a second transport key (e.g., transport key pair) and encrypt with a first issuer key.

The first and second transport keys (e.g., transport key/transport key pair) may provide the key setup between the wallet provider 204 and the authentication application module 214 for encryption and secure transmission of the personal identifier from the consumer's device 202 to the authentication cloud 206. For example, the first transport key may be an asymmetric public key and the second transport key may be an asymmetric private key. In one embodiment, the first and second transport keys are implemented as 128 bits DES (Data Encryption Standard) or Triple DES keys. The first financial key may be a Derived Unique Key Per Transaction (DUKPT). It may use one time encryption keys that can be derived from a secret master key that is shared by the entity (or device) that encrypts and the entity (or device) that decrypts the data.

The authentication module 414 may be configured to determine that the personal identifier received by the receiver module 410 matches a previously stored personal identifier for the consumer and generate an authentication indicator indicating a authentication result. The authentication module 414 may also be configured to generate a digital certificate for every transaction. In one embodiment, the issuer 210 may provide an issuer key for the generation of the digital certificate. In one embodiment, if the digital certificate/CAVV provided or if the card PIN is incorrect, the transaction may be declined by the issuer 210.

The authentication module 414 may be configured to provide authentication APIs that can allow the wallet provider's core system to securely connect to the authentication cloud 206 or a similar core system in the payment processing network 212. In one embodiment, the authentication APIs may allow the wallet provider 204 to perform functions such as provide/receive consumer alias/mobile phone number/payment account details, receive shared secret, provide transaction authorization (e.g., MID, amount), receive the digital certificate, receive the encrypted card PIN, provide authorization response data, and allow administrative and reporting access.

The request generation module 416 may be configured to generate an authentication request message to request the consumer to enter a personal identifier using the consumer device 202. The request generation module 416 may also be configured to generate an authorization request message after receiving the personal identifier from the consumer device 202. In one embodiment, the authorization request message may include an account identifier associated with the account of the consumer issued by issuer 210. In one embodiment, the authorization request message may include the account identifier, personal identifier and/or the authentication indicator.

Figure 5:
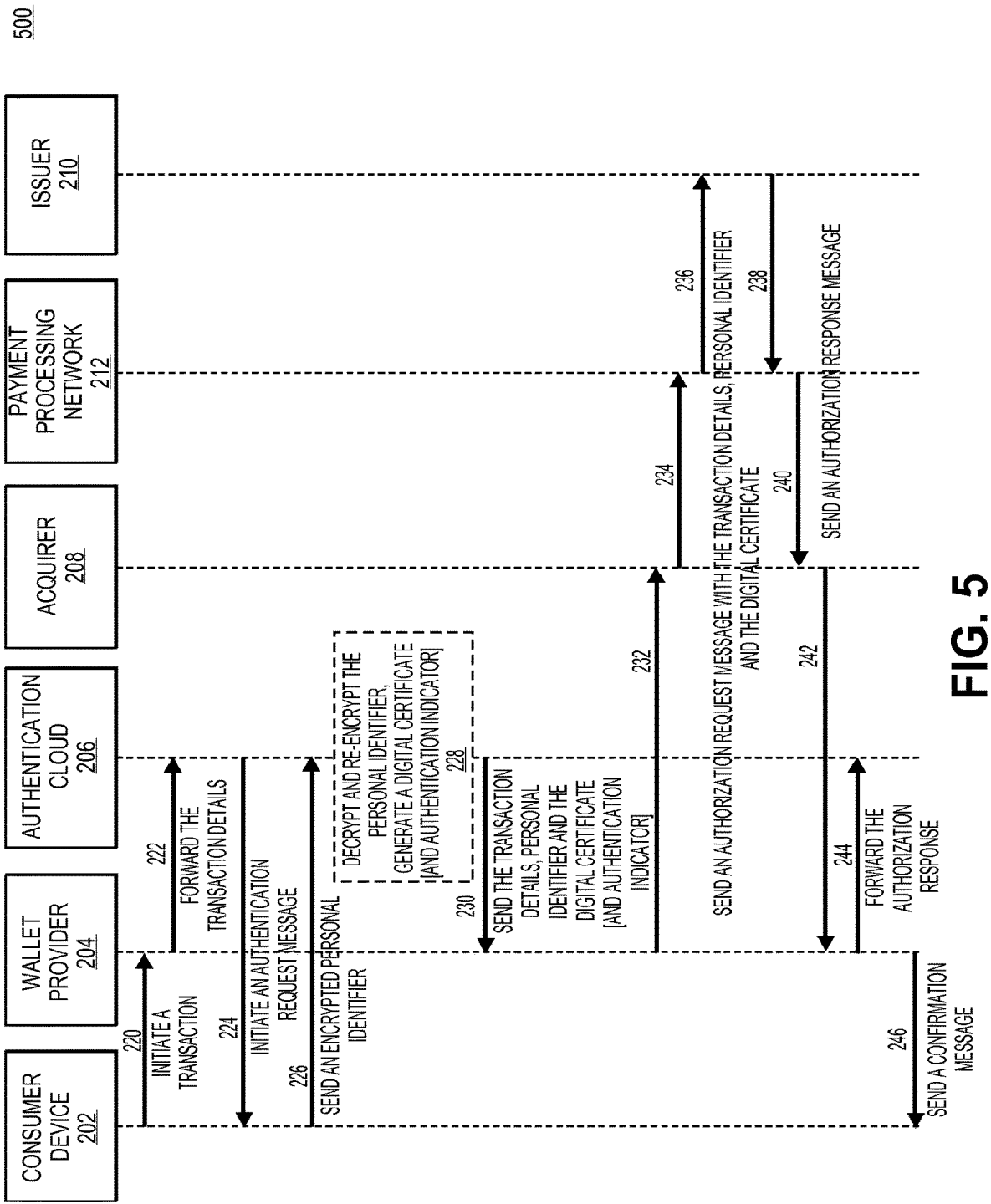
FIG. 5 illustrates a flow diagram for a PIN authenticated card-not-present transaction in one embodiment of the invention.

FIG. 5 illustrates a flow diagram for a PIN authenticated card-not-present transaction in one embodiment of the invention.

As discussed in step 1 with reference to FIG. 2, when a transaction is initiated by a consumer, a transaction initiation message 220 may be sent to the wallet provider 204 from the consumer device 202 or a merchant associated with the transaction initiation channel provider 104. The transaction may be initiated using any of the transaction initiation channels as described previously. For example, the transaction may be initiated by a consumer via the wallet provider 204's mobile application on the consumer device 202.

As discussed in step 2 with reference to FIG. 2, the wallet provider 204 may forward the transaction details to the authentication cloud 206 in a message 222. In one embodiment, the transaction details may include consumer's alias, mobile phone number, and the payment account details such as the payment account number, expiration date, etc.

The authentication cloud 206 may initiate the transmission of an authentication request message 224 to the consumer device 202. For example, the request generation module 416 may generate the authentication request message 224 for transmission to consumer device 202 to request the consumer to enter a PIN or a personal identifier. In one embodiment, the personal identifier may be a biometric identifier.

The consumer device 202 may send a personal identifier to the authentication cloud 206 in a message 226. The personal identifier may be encrypted using a first transport key at the consumer device 202. For example, the first transport key may be installed by the key management module 412 using the mobile application module 320.

In step 228, the key management module 412 may decrypt the encrypted personal identifier using a second transport key and encrypt the decrypted personal identifier using a first issuer key. In one embodiment, the authentication module 414 may generate a digital certificate using a financial key provided by the issuer 210.

The authentication cloud 206 may send the transaction details, encrypted personal identifier and the digital certificate to the wallet provider 204 in a message 230 to initiate the sending of an authorization request message. In one embodiment, initiating the sending of the authorization request message may include generating the authorization request message comprising the account identifier and the personal identifier. In one embodiment, initiating the sending of the authorization request message may include providing the personal identifier or an authentication indicator and a digital certificate that indicates that the received personal identifier matched a previously stored personal identifier to wallet provider 204. The authentication indicator may indicate a positive or a negative authentication result.

The wallet provider 204 may send the transaction details, encrypted personal identifier and the digital certificate to the acquirer 208 in an authorization request message 232. In one embodiment, the authorization request message 232 may also include an authentication indicator.

The acquirer 208 may forward the transaction details, encrypted personal identifier and the digital certificate to the payment processing network 212 in an authorization request message 234. In one embodiment, the authorization request message 234 may also include an authentication indicator.

The payment processing network 212 may forward the transaction details, encrypted personal identifier and the digital certificate to the issuer 210 in an authorization request message 236. In one embodiment, the authorization request message 236 may also include an authentication indicator.

The issuer 210 may validate the payment account number, expiration date, personal identifier, and the digital certificate. In one embodiment, the issuer 210 may decrypt the personal identifier using the second issuer key before validating the personal identifier. The issuer 210 may send a result of the authorization to the payment processing network 212 in an authorization response message 238. For example, the authorization result may indicate if the transaction was approved or declined.

The payment processing network 212 may forward the authorization result to the acquirer 208 in an authorization response message 240.

The acquirer 208 may forward the authorization result to the wallet provider 204 in an authorization response message 242.

The wallet provider 204 may forward the authorization response to the authentication cloud 206 in a message 244. The authorization response data may be saved by the authentication cloud 206 and can be used in future to indicate that the payment account/mobile phone number combination is valid and can be federated elsewhere.

The authentication cloud 206 may send a confirmation message to the consumer device 202 in a message 246. The confirmation message may include that the authentication was successful. In one embodiment, a summary of the consumer's transaction may be provided via the authentication application module 214. In one embodiment, the confirmation message may be sent via a different channel (e.g., text or email) than the transaction initiation channel.

Figure 6B:
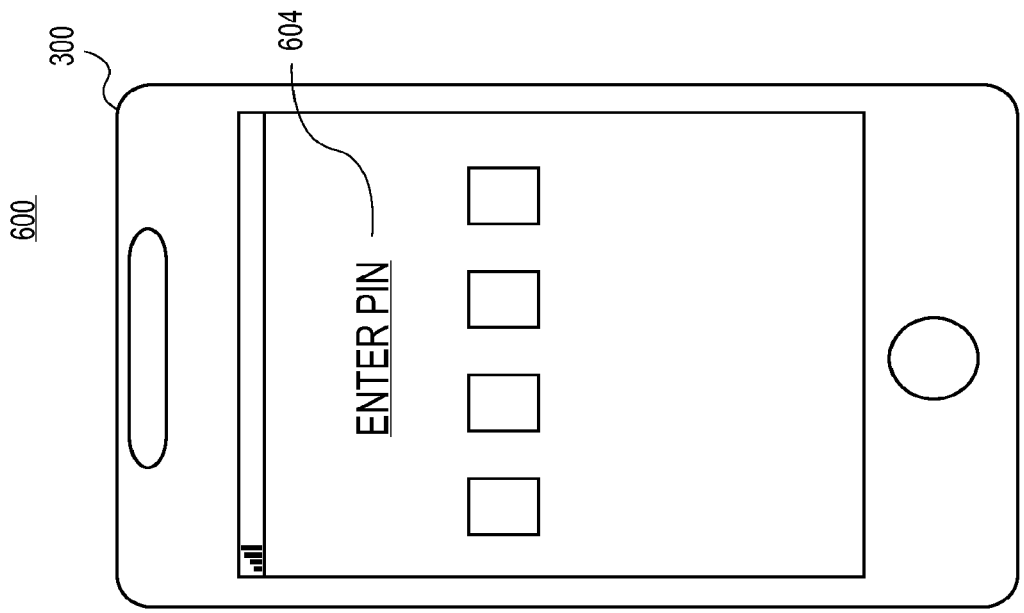
FIGS. 6A-6B illustrate screen shots of a mobile device, in one embodiment of the invention.
Figure 6A:
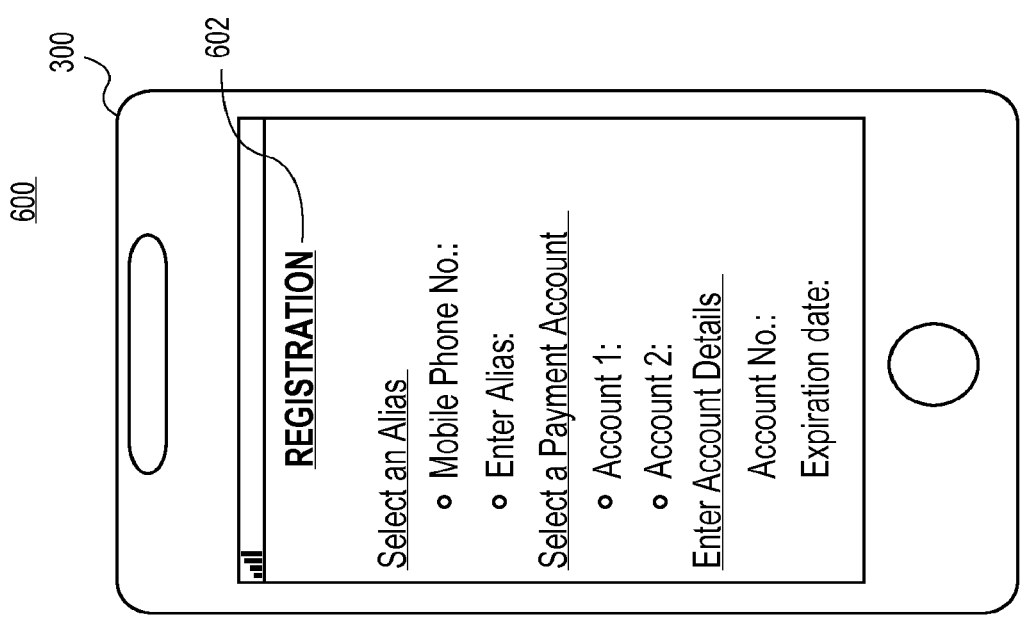

As discussed with reference to FIG. 1, a consumer may register their card (or payment account) details and the phone number with the wallet provider 204 and/or the authentication cloud 206 before initiating a transaction. FIG. 6A illustrates a display message 602 for registration of a payment account using a mobile device 300. The consumer may be able to select a consumer alias (e.g., a mobile phone number or an alpha-numeric value) and one or more existing payment accounts. The consumer may also be prompted to provide details for adding a new account. FIG. 6B illustrates a display message 604 on the mobile device 300 to enter a PIN. For example, the display message 604 may be displayed in response to an authentication request received by the mobile device 300. In one embodiment, the PIN may include four digits. However, it will be understood that any suitable personal identifier (e.g., having any number of digits or characters and/or having an alpha-numeric value) may be used in place of the PIN.

Authentication Using Different Transaction Networks

Figure 7:
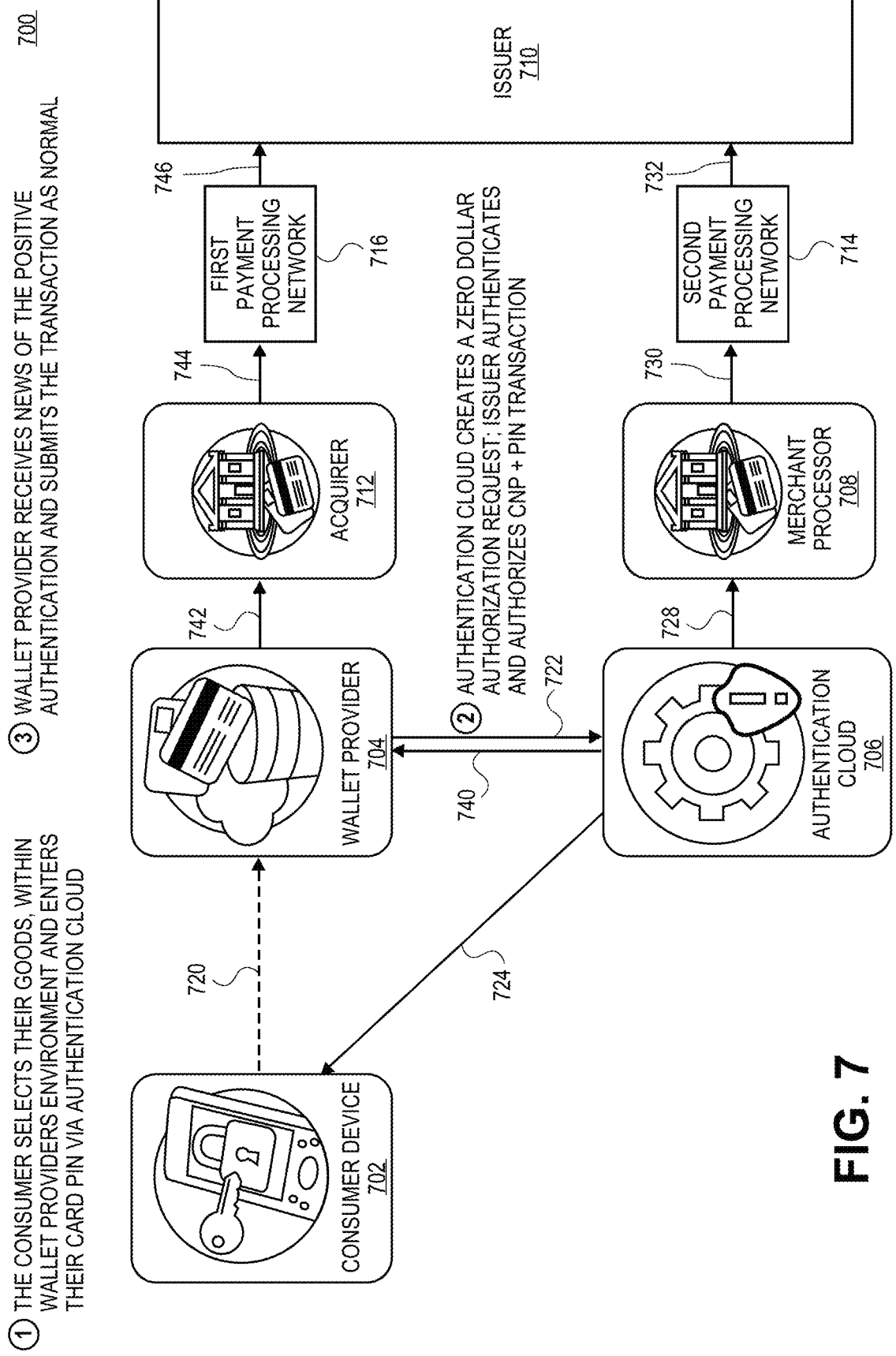
FIG. 7 illustrates a system diagram illustrating a process flow using different transaction networks according to an embodiment of the invention.

One embodiment of the invention can incorporate the use of different transaction networks to perform authentication and authorization processing, as illustrated in FIG. 7.

FIG. 7 shows a system including a consumer device 702, a wallet provider 704, and an authentication cloud 706. The wallet provider 704 may be in communication with an acquirer 712. The acquirer 712 may be in communication with an issuer 714 via a first payment processing network 716. The authentication cloud 706 may be in communication with a merchant processor 708 and the issuer 710. The merchant processor 708 and the issuer 710 may be in communication with each other via a second payment processing network 714. The wallet provider 704 may be similar to the wallet provider 204 and the authentication cloud 706 may be similar to the authentication cloud 206, as discussed with reference to FIG. 2. In one embodiment, the authentication cloud 706 may include an authentication server computer (e.g., authentication server computer 400).

The first and second payment processing networks may have any suitable characteristics. The first and second payment processing networks may be operated by two different payment processing networks and/or organizations. Different payment processing organizations may include VisaNet®, Mastercard Worldwide Network®, Discover Network®, Pulse®, etc. They may include different fraud engines, as well as different authorization and settlement process modules and/or different security policies.

The consumer device 702 may be similar to the consumer device 202. In one embodiment, the consumer device 702 can be implemented as mobile device 300 including the components as described with reference to FIG. 3. The authentication cloud 706 may include a server computer such as the authentication server computer 400, as discussed previously with reference to FIG. 4. Further, as discussed with reference to FIG. 1, a consumer may register their card (or payment account) details and the phone number with the wallet provider 704 and/or the authentication cloud 706 before initiating a transaction.

In step 1, a consumer may select goods within the wallet provider 704's environment, and the consumer can enter their card PIN (or personal identifier) via the authentication cloud 706. In one embodiment, the consumer can initiate a transaction using one of the transaction initiation channels as described previously. This information can be sent from the wallet provider 704 to the authentication cloud 706. The authentication cloud 706 may send a request to the consumer device 702 to provide a personal identifier. In response, the consumer can enter their personal identifier (e.g., card PIN) via an authentication application module (e.g., authentication application module 214) that may be integrated into the mobile application associated with the wallet provider 704 via SDKs.

In step 2, the authentication cloud 706 may create a zero dollar authorization request and send it to the merchant processor 708. The zero dollar authorization may provide an effective means for verification of the payment account number and the personal identifier before the actual transaction is sent for authorization via the first payment processing network 716. The merchant processor 708 may then forward the zero dollar authorization request to the issuer 710 (e.g., an issuer computer) via the second payment processing network 714. The merchant processor 708 may be an optional component, and could alternatively be substituted with an acquirer (e.g., acquirer 208). The issuer 710 may then authenticate the PIN if the PIN matches a previously stored PIN. It may then generate and transmit an authentication response message with an authentication indicator back to the authentication cloud 706 via the second payment processing network 714 and the merchant processor 708. The authentication indicator may include an authentication result verifying the personal identifier. The authentication cloud 706 may forward the authentication indicator with the personal identifier to the wallet provider 704.

In step 3, the wallet provider 704 may receive the authentication indicator with the positive authentication results from the authentication cloud 706. The wallet provider 704 then may generate and transmit an authorization request message for the actual transaction being conducted including the authentication indicator to the issuer 710 via the first payment processing network 716. The authorization request message may include the transaction amount, account number, transaction indicator, and any other suitable transaction data. After the issuer 710 receives the authorization request message for the actual transaction, it can respond by generating an authorization response message. The authorization response message may be sent to the wallet provider 704 via the acquirer 712. If the transaction is approved, at some point in time (e.g., at the end of the day), a clearing and settlement process can occur. In one embodiment, if the authentication indicator includes a negative authentication result then the wallet provider 704 may not generate the authorization request message. The authentication cloud 706 or the wallet provider 704 may send a message to the consumer 702 informing of the failed authentication. In one embodiment, the consumer may be prompted to re-enter the personal identifier after the first failed attempt.

Figure 8:
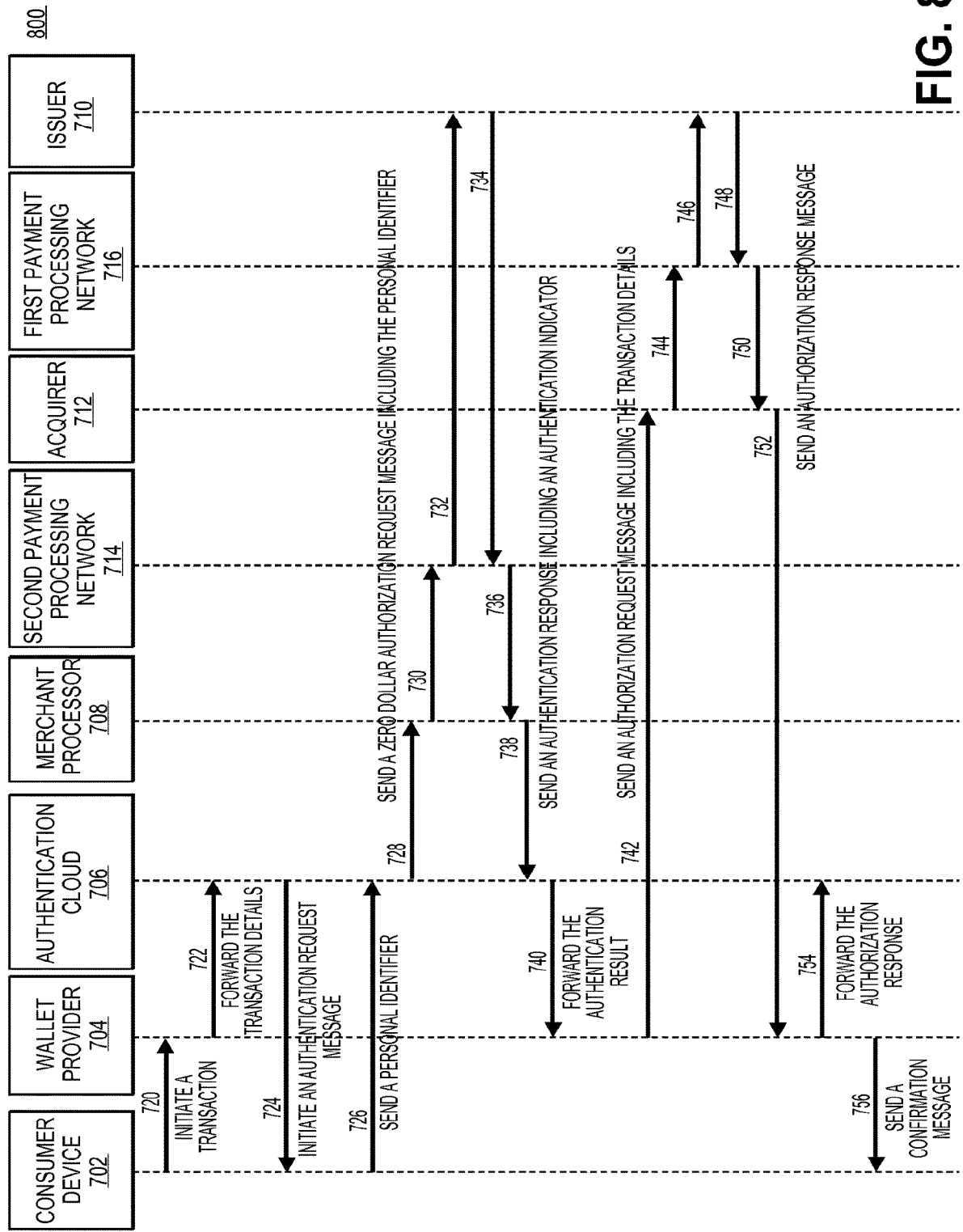
FIG. 8 illustrates a flow diagram for a PIN authenticated transaction using different transaction networks, in one embodiment of the invention.

Further details of the process flow are described with reference to FIG. 8. FIG. 8 illustrates a flow diagram for a PIN authenticated card-not-present transaction using different networks, in one embodiment of the invention.

When a transaction is initiated by a consumer operating consumer device 702, a transaction initiation message 720 may be sent to the wallet provider 704 from the consumer device 702. As discussed previously, the transaction may be initiated using a channel for a consumer or a merchant such as a mobile initiation channel, an Internet initiated channel, a physical point of sale initiated channel, etc. In one embodiment, the consumer may use a mobile application associated with the wallet provider 704 (e.g., mobile application module 320) to select goods and initiate the checkout process with a consumer alias associated with the wallet provider 704.

The wallet provider 704 may forward the transaction details to the authentication cloud 706 in a message 722. Transaction details may include consumer's alias, mobile phone number, and the payment account details.

The authentication cloud 706 may initiate an authentication request message 724 to the consumer device 702 after receiving the transactions details. For example, the authentication request message 724 may display a shared secret and request the consumer to enter a personal identifier on the consumer's mobile device. In one embodiment, the authentication request may be generated by the request generation module 416. The personal identifier may be a card PIN or a biometric identifier.

The consumer may provide the personal identifier using the consumer device 702. For example, the consumer may enter the personal identifier using the authentication application module 214. The consumer device 702 may send the personal identifier to the authentication cloud 706 in a message 726. In one embodiment, the personal identifier may be encrypted before sending to the authentication cloud 706. For example, as discussed with reference to FIG. 2, the personal identifier may be encrypted using a first transport key.

The authentication cloud 206 may send a zero dollar authorization request message 728 including the personal identifier to the merchant processor 708. In one embodiment, the authentication cloud 706 may decrypt the personal identifier using the second transport key and re-encrypt the personal identifier using the first issuer key. In one embodiment, the zero dollar authorization request message 728 may be generated by the request generation module 416.

The merchant processor 708 may forward the zero dollar authorization request message 730 including the personal identifier to the second payment processing network 714.

The second payment processing network 714 may forward the zero dollar authorization request message 732 including the personal identifier to the issuer 710.

The issuer 710 may authenticate the personal identifier and send an authentication response message 734 including an authentication indicator to the second payment processing network. For example, the issuer 710 may compare the personal identifier provided by the consumer with a stored personal identifier to provide the authentication indicator. In one embodiment, the issuer 710 may decrypt the personal identifier using the second issuer key before the comparison. The authentication indicator may include a positive authentication result if the personal identifier matched, otherwise the authentication indicator may include a negative authentication result if the personal identifier didn't match.

The second payment processing network 714 may forward an authentication response message 736 including the authentication indicator to the merchant processor 708.

The merchant processor 708 may forward an authentication response message 738 including the authentication indicator to the authentication cloud 706.

The authentication cloud 706 may forward the authentication indicator with a positive authentication result to the wallet provider 704 in a message 740. In one embodiment, the request generation module 416 may generate a request including the authentication indicator for authorization of the transaction using the normal transaction flow. In one embodiment, the request generation module 416 may generate a message for the wallet provider 704 if the authentication indicator from the issuer 710 includes a negative authentication result so that the wallet provider 704 may inform the consumer of the negative authentication result.

The wallet provider 704 may send an authorization request message 742 including the transaction details to the acquirer 712. In one embodiment, the authorization request message 742 may include transaction details, payment account details and the positive authentication result.

The acquirer 712 may forward the authorization request message to the first payment processing network 716 in a message 744.

The first payment processing network 716 may forward the authorization request message to the issuer 710 in a message 746.

The issuer 710 may authorize the transaction and send an authorization response message 748 to the first payment processing network 716. For example, the authorization response message may indicate if the transaction was approved or declined (e.g., insufficient funds). In some embodiments, the authorization response message may include an authorization code to indicate a reason for declining the transaction.

The first payment processing network 716 may forward the authorization response to the acquirer 712 in a message 750.

The acquirer 712 may forward the authorization response to the wallet provider 704 in a message 752.

The wallet provider 704 may forward the authorization response to the authentication cloud 706 in a message 754.

The authentication cloud 706 may send a confirmation message to the consumer device 702 in a message 756. In one embodiment, a summary of the transaction may be provided to the consumer device 702 via the authentication application module 214.

Authentication Using Biometrics

In some embodiments, biometrics may be used to authenticate a consumer for a transaction. To register the biometrics for use in transactions, a consumer may first be authenticated using a card PIN or another personal identifier as discussed previously with reference to FIGS. 1-8. If the card PIN authentication is successful, then the consumer may be requested to register a biometric identifier that can be bound to the PIN by an authentication cloud (e.g., authentication server computer 400). Some non-limiting examples of the biometric identifier may include fingerprints, voice recording, and facial characteristics or expressions. The consumer can be authenticated using the biometric identifier for future transactions once the consumer has been registered with the authentication cloud. If the consumer cannot be authenticated using the biometric identifier, authentication can fall back to the PIN authentication as discussed previously.

Figure 9:
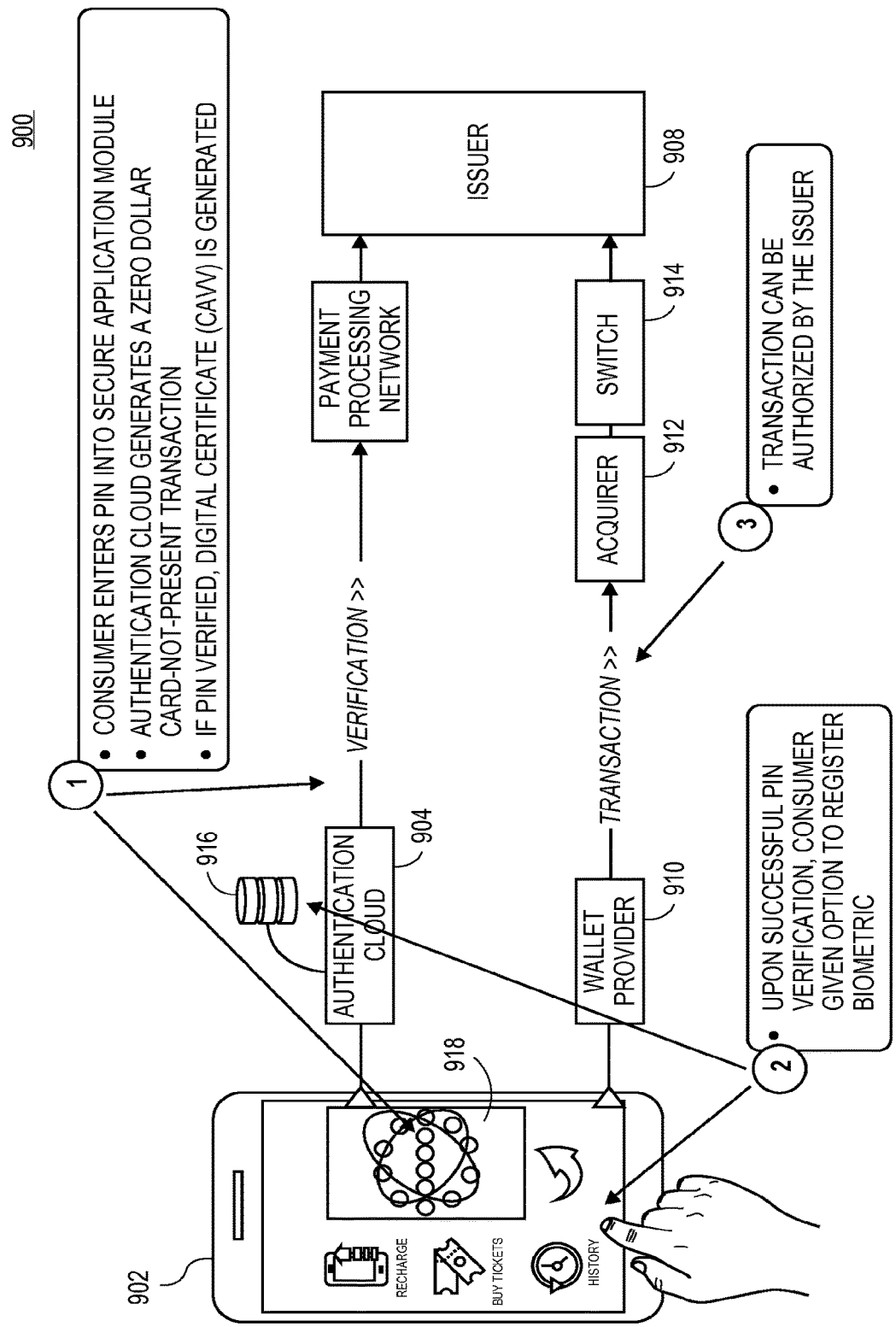
FIG. 9 illustrates a system illustrating a process for biometrics authentication, in one embodiment of the invention.

FIG. 9 shows a system 900 illustrating a process that uses biometrics authentication, in one embodiment of the invention.

The system 900 may include a mobile device 902, an authentication cloud 904, a payment processing network 906, an issuer 908, a wallet provider 910, an acquirer 912, a switch 914 and a database 916. The circled numbers represent the order of part of a process flow in one embodiment; however, other process flows or other order of the process may be implemented in the system 900. Note that each of the authentication cloud 904, payment processing network 906, issuer 908, wallet provider 910, acquirer 912 and the switch 914 may be associated with a computer apparatus (e.g., a server computer), similar to the one described with reference to FIG. 10. Each of the entities in FIG. 9 may utilize one or more communication channels to send and/or receive messages. Some components of the system 900 are described in further detail below.

The mobile device 902 may be similar to the mobile device 300 and may include some or all of the components as described with reference to FIG. 3 as well as additional components not shown. The mobile device 902 may be configured to allow a consumer to register one or more biometric identifiers for authentication. For example, the consumer can register their fingerprints using a fingerprint sensor (e.g., using a touch screen interface of the display 312), voice using the microphone 314, and/or a photo of the consumer (e.g., facial expressions) using the camera unit 324.

The authentication cloud 904 may include an authentication server computer (e.g., authentication server computer 400). The authentication cloud 904 may be configured to initiate an authentication request message to a consumer device (e.g., mobile device 902) for the consumer to provide a card PIN or another personal identifier. For example, the consumer may enter the card PIN using a secure application module 918 executing on the mobile device 902. In one embodiment, the secure application module 918 may be associated with the payment processing network 906 (e.g., VisaNet®) and may be invoked inside a merchant or a wallet provider's application (e.g., wallet provider 910). The secure application module 918 may be similar to the authentication application module 214 as discussed with reference to FIGS. 2-4.

The authentication cloud 904 may also be configured to obtain an account identifier (e.g., payment account number) based on a consumer alias (e.g., mobile phone number) associated with the wallet provider 910. For example, the account identifier may be retrieved using the alias from a database that may store consumer's personal account information and personal identifying information. In one embodiment, the database may be associated with the COF service 110. In one embodiment, the database may be database 404 in the authentication server computer 400. In one embodiment, the database may be database 916 that may also store consumer's biometric identification information.

The authentication cloud 904 may also be configured to generate a zero dollar authorization request message during a registration process and send it to the payment processing network 906. In one embodiment, the zero dollar authorization request message may include the card PIN provided by the consumer and consumer information such as name, address, phone number, consumer alias, etc. In some embodiments, if the card PIN was encrypted on the mobile device 902 (e.g., using a first transport key), then the authentication cloud 904 may decrypt the card PIN using a second transport key (e.g. transport key pair) and re-encrypt the card PIN with a first issuer key. The authentication cloud 904 may also be configured to receive an authentication indicator. If the authentication indicator includes a successful or positive authentication result then the authentication cloud 904 may initiate a biometric identifier registration request to the mobile device 902. The consumer may provide one or more biometric identifiers using the mobile device 902. The authentication cloud 904 may receive the one or more biometric identifiers from the mobile device 902 and associate the one or more biometric identifiers with the consumer's card PIN. In one embodiment, information associated with the one or more biometric identifiers may be stored in the database 916. In some embodiments, the database 916 may also store consumer details such as consumer alias, personal account information (e.g., primary account number, expiration date, etc.) and personal identifying information (e.g., name, address, phone number, date of birth, etc.). In some embodiments, the card PIN or another personal identifier may be linked to the one or more biometric identifiers stored in the database 916.

The authentication cloud 904 may also be configured to generate a digital certificate after receiving a positive authentication result of the card PIN. In one embodiment, the authentication cloud 904 may provide the digital certificate and the account details to the wallet provider 910 so that the wallet provider can initiate an authorization request message to the issuer 908.

The payment processing network 906 may be same as the payment processing network 212. The payment processing network 906 may be configured to provide the secure application module 918 to the mobile device 902 that can connect to a wallet provider 910's application through an API. The payment processing network 906 may be configured to forward the zero dollar authorization request message to the issuer 908.

The issuer 908 may be same as the issuer 210 and may be associated with an issuer computer. The issuer 908 may be configured to verify the card PIN received in the zero dollar authorization request message against the stored card PIN associated with the consumer's alias or account. In one embodiment, the issuer 908 may decrypt the card PIN using a second issuer key before verifying the PIN. An authentication indicator may be generated with a positive or negative authentication result. In one embodiment, the authentication indicator may be represented as a binary value (e.g., a "1" for positive authentication result and a "0" for negative authentication result). The issuer 908 may forward the authentication indicator to the payment processing network 906.

In one embodiment, the payment processing network 906 may verify the card PIN and generate the authentication indicator that may be forwarded to the authentication cloud 904.

The wallet provider 910 may be similar to the wallet provider 204 and may be associated with a wallet server computer or a merchant server computer. In one embodiment of the invention, the wallet provider 910's transaction initiation interface (e.g., mobile application, website) may enable the consumer to initiate transactions with their mobile phone number. In one embodiment, the wallet provider 910 may also provide the authentication application module 214 to enable the consumer to input their card PIN or biometrics via a certified Software Development Kit (SDK) on the mobile device 902. In one embodiment, the wallet provider 910 may receive a digital certificate indicating a successful authentication of the consumer and generate an authorization request message comprising an account identifier and the digital certificate. The wallet provider 910 may further send the authorization request message comprising the account identifier and the digital certificate to the issuer 908 via the acquirer 912 and the switch 914.

The acquirer 912 may be similar to the acquirer 208. The acquirer 912 may be configured to route the authorization request message for a transaction to the issuer 908 via the switch 914. The switch 914 may be configured to route a transaction to the issuer 908 over a debit or credit network.

The process of registering a consumer's biometrics and performing a subsequent transaction will now be described in more details with reference to FIG. 9. In step 1, a consumer can enter a PIN into the secure application module 918 (e.g., an authentication application module) on the mobile device 902 to authenticate himself/herself during a registration process. For example, the consumer can launch the secure application module 918 and select a link for biometrics registration. The secure application module 918 may prompt the consumer to enter a PIN to authenticate the consumer before requesting the biometric identifiers. The PIN may be sent from the mobile device 902 to the authentication cloud 904. The authentication cloud 904 may generate a zero dollar authorization request message and send to the payment processing network 906. The payment processing network 906 or the issuer 908 may verify the PIN and generate an authentication indicator that may be sent to the authentication cloud 904. The authentication cloud 904 may receive the authentication indicator and generate a digital certificate if the authentication indicator includes a positive authentication result.

In step 2, the consumer may be given the option to register one or more biometric identifiers using the mobile device 902 after verification of the PIN. For example, the consumer can register one or more fingerprints using a fingerprint sensor, a voice of the consumer recorded by the microphone 314, and/or a photo of the consumer (e.g., facial expressions) using the camera unit 324. In one embodiment, the authentication cloud 904 may link or associate the one or more biometric identifiers with the consumer's card PIN and store the one or more biometric identifiers in the database 916. At this point, the biometric identifiers have been registered with the system and can be used for authenticating future transactions. For a future transaction, the authentication cloud 904 may verify the biometric identifier provided by the consumer for a transaction against the stored one or more biometric identifiers in the database 916.

In step 3, an actual transaction may be performed. The transaction can be initiated using any of the techniques described herein. Upon initiation of the transaction, the secure application module 918 may be launched, and the secure application module 918 may request the consumer to input one or more biometric identifiers to carry out the transaction. The consumer may enter the one or more biometric identifiers in a similar manner as the registration process (e.g., by scanning one or more fingerprints on a fingerprint sensor, by recording the consumer's voice via microphone 314, and/or by capturing a photo of the consumer (e.g., facial expressions) using camera unit 324. In some embodiments, only one biometrics identifier may be used to authenticate the transaction. In some embodiments, a combination of two or more biometric identifiers can be used. The one or more biometric identifiers can then be sent to authentication cloud 904 and be validated against the biometric identifiers stored in database 916 during the registration process. If the one or more biometric identifiers are validated, authentication cloud 904 may generate a digital certificate and/or a verification value (e.g., a Cardholder Authentication Verification Value (CAW), etc.). In some embodiments, if the one or more biometric identifiers cannot be validated, the user may be requested to carry out the transaction using a PIN or personal identifier, and the transaction can proceed by using the PIN or personal identifier similar to any of the processes describes above. The digital certificate and/or verification value and an account identifier may then be provided to the wallet provider 910 after the consumer has been authenticated either using the one or more biometric identifiers. In some embodiments, authentication cloud 904 may provide a positive authentication indicator to the secured application module 918 or wallet provider 910, and the secured application module 918 or wallet provider 910 may be the entity that generates the digital certificate and/or the verification value.

It should be understood that the biometrics authentication is performed before communicating with an issuer regarding the actual transaction being performed by the consumer. The benefits of doing so are similar to those described with reference to the other embodiments. The wallet provider 910 may then generate an authorization request message to continue the transaction. The authorization request message may include the digital certificate and/or the verification value, along with additional transaction details such as the account identifier and a transaction amount. The transaction may then be authorized by the issuer 908 using a transaction flow similar to those described above.

Although the above description has described the registration process in steps 1 and 2 as a distinct process from the actual transaction performed in step 3, in some embodiments, the registration process can be carried out as part of an actual transaction if the consumer has not previously registered. For example, after an actual transaction is initiated according to any of the techniques described herein, the consumer may be requested to enter a PIN to begin the registration process.

Note that the card PIN, biometric identifier and the digital certificate may be encrypted/decrypted using the appropriate transport/issuer keys as discussed previously with reference to FIG. 2.

One embodiment of the invention allows biometric authentication using a transaction device (e.g., a non-personal device) such as an ATM (Automated Teller Machine) or a merchant device such as a POS terminal or a mobile POS terminal. In one embodiment, any of these transaction devices may connect into the authentication cloud 904 (e.g., using a communication network such as the Internet) and provide a payment account number for authentication. For example, a consumer may swipe a payment card at a POS terminal or at an ATM. The authentication cloud 904 may obtain a mobile phone number associated with the payment account number and send an authentication request message to the consumer's mobile device 902. The consumer may provide a biometric identifier in response to the authentication request message that may be sent to the authentication cloud 904. The authentication cloud 904 may verify the biometric identifier against the stored one or more biometric identifiers associated with the consumer's account and generate a digital certificate and/or verification value. The authentication cloud 904 may forward the digital certificate to the transaction device so that the consumer can move forward with the transaction. In one embodiment, the transaction device may forward the transaction details including the digital certificate to the acquirer/issuer over a switch.

As discussed with reference to FIGS. 1-9, a card not present transaction can be authenticated using a card PIN or a biometric identifier before communicating with the issuer associated with the payment account used for the transaction. Embodiments of the invention can provide instant authorization given the correct PIN provided and issuer approval. Embodiments of the invention are easy to use and convenient for consumers. Further, transaction processing can occur using a standard payment processing infrastructure. Also, embodiments of the invention provide for minimal integration for all issuers, acquirers/merchants, and MNOs (mobile network operators). Additionally, embodiments of the invention can be open to all consumers with payment cards with PIN from participating issuers and MNO accounts from a participating MNO.

Embodiments of the invention can have the potential to allow merchants that do not have a card/phone database and/or have a merchant processor to connect to the system for performing consumer authentication. Embodiments of the invention can have the potential to allow additional merchant types, e.g., merchants aggregated by a PSP or large merchants to connect to the authentication cloud for PIN or biometric authentication. Embodiments of the invention can have the potential to allow the integration of the PIN authentication with with the VbV® process, thus allowing all transactions with PIN or VbV® initiated to be authenticated with the PIN.

Embodiments of the invention can enable wallet providers to register/authenticate consumers by allowing them to enter their card PIN via the consumer's mobile device. The resulting transaction, a card-not-present PIN authenticated transaction, can then be authorized by the issuer assuming the card PIN is correct and there are sufficient funds. The proposed solution can provide wallet providers with an application module that can be embedded within the wallet provider's application to enable card PIN entry on the consumer's mobile device. Coupled to this, an API can facilitate data exchange between the wallet provider's core systems with the core system of a payment processing network.

Embodiments of the invention provide solutions for remote payments that can be enabled in a scalable and global manner. The payment processing network can facilitate payment card authentication across multiple wallet providers/merchants and inextricably link this authentication to a payment liability shift.

The various participants and elements described herein with reference to FIGS. 1, 2, 7 and 9 may operate one or more computer apparatuses to facilitate the functions described herein. Any of the elements in FIGS. 1, 2, 7 and 9, including any servers or databases, may use any suitable number of subsystems to facilitate the functions described herein.

Figure 10:
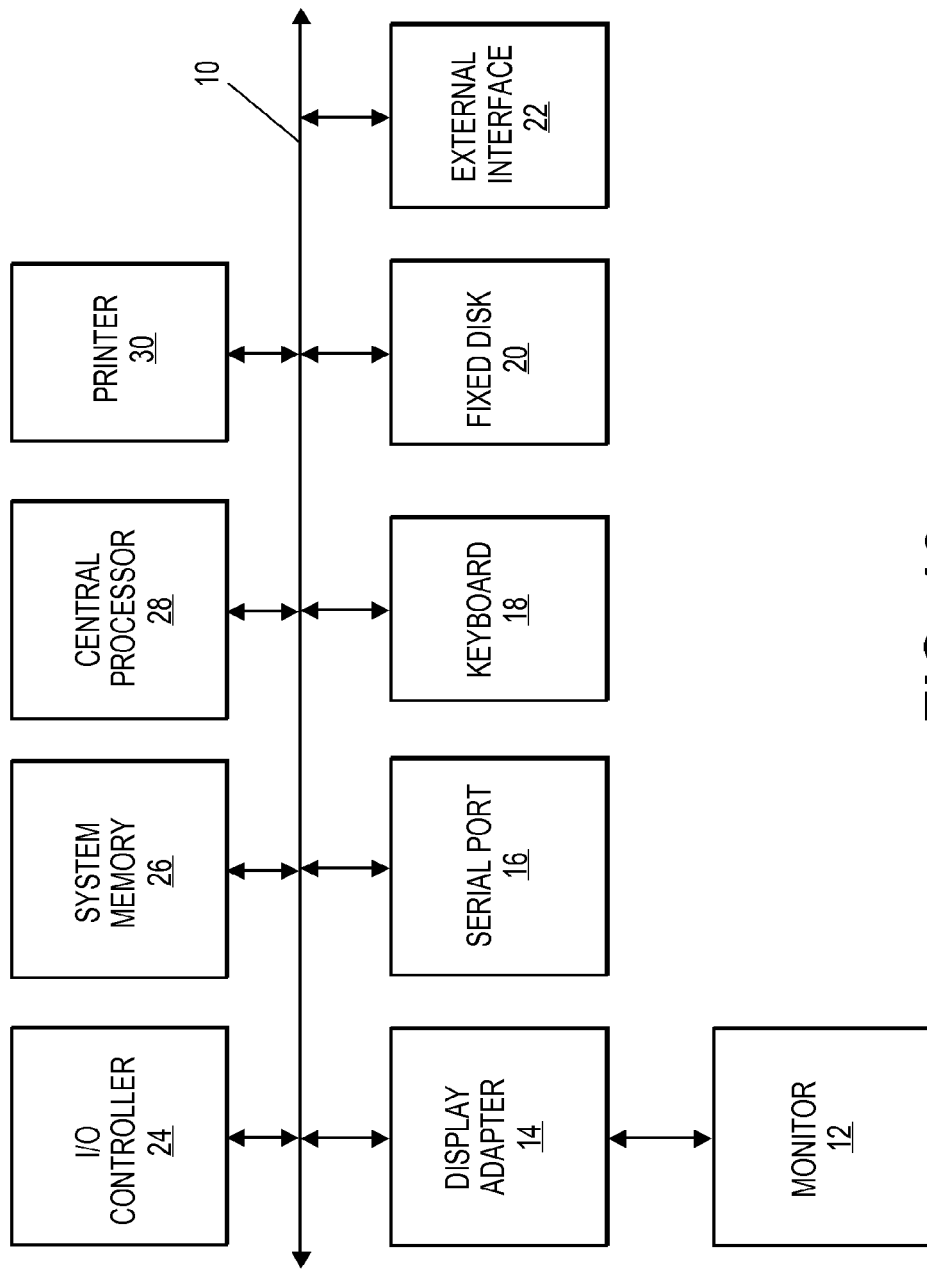
FIG. 10 is a block diagram of a computer apparatus.

Examples of such subsystems or components are shown in FIG. 10. The subsystems shown in FIG. 10 are interconnected via a system bus 10. Additional subsystems such as a printer 30, keyboard 18, fixed disk 20 (or other memory comprising computer readable media), monitor 12, which is coupled to display adapter 14, and others are shown. Peripherals and input/output (I/O) devices, which couple to I/O controller 24 (which can be a processor or other suitable controller), can be connected to the computer system by any number of means known in the art, such as serial port 16. For example, serial port 16 or external interface 22 can be used to connect the computer apparatus to a wide area network such as the Internet, a mouse input device, or a scanner. The interconnection via system bus allows the central processor 28 to communicate with each subsystem and to control the execution of instructions from system memory 26 or the fixed disk 20, as well as the exchange of information between subsystems. The system memory 26 and/or the fixed disk 20 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving a personal identifier by an authentication server computer from a mobile device of a user;
sending, by the authentication server computer, the personal identifier to an issuer computer in a zero dollar authorization request message over a first payment network in a verification communication channel;
receiving an authorization response message comprising an authentication indicator from the issuer computer, wherein the authentication indicator indicates successful authentication of the personal identifier;
after successfully completing an initial authentication of the personal identifier with the issuer computer, initiating, by the authentication server computer, a request to the mobile device for registering one or more biometric identifiers of the user, wherein registering includes:
receiving the one or more biometric identifiers from the mobile device;
associating, by the authentication server computer, the one or more biometric identifiers with the personal identifier, and
storing the one or more biometric identifiers at a database along with information associated with the personal identifier;
receiving, by the authentication server computer, at least one of the one or more biometric identifiers in connection with a transaction over a transaction communication channel that is different than the verification communication channel;
validating the received at least one of the one or more biometric identifiers against the one or more biometric identifiers stored at the database;
generating, by the authentication server computer, a verification value validating authenticity of the received at least one of the one or more biometric identifiers; and
forwarding, by the authentication server computer, the verification value to a gateway computer during the transaction,
wherein the gateway computer initiates a transaction authorization request message for the transaction to the issuer computer including the verification value over a second payment network in the transaction communication channel.

2. The method of claim 1 wherein the gateway computer is a wallet server computer.

3. The method of claim 1 wherein the first payment network and the second payment network are configured to process credit and debit card transactions.

4. The method of claim 1 wherein the personal identifier is a personal identification number (PIN) and the one or more biometric identifiers include a fingerprint, a voice recording, or an image of the user.

5. The method of claim 1 further comprising:
receiving, by the authentication server computer, the one or more biometric identifiers from the mobile device for conducting the transaction, the one or more biometric identifiers being received before communicating with the issuer computer regarding the transaction being conducted;

after receiving the one or more biometric identifiers from the mobile device, validating the one or more biometric identifiers against one or more registered biometric identifiers;

when the one or more biometric identifiers are validated against the one or more registered biometric identifiers:
generating the verification value for the transaction being conducted based on the validated one or more biometric identifiers; and
initiating the sending of an authorization request message comprising an account identifier associated with an account and the verification value to the issuer computer to carry out the transaction, and when the one or more biometric identifiers fail to be validated against the one or more registered biometric identifiers:
initiating the sending of the authorization request message comprising the account identifier associated with the account and the authentication indicator associated with the personal identifier to the issuer computer to carry out the transaction.

6. The method of claim 1, wherein the personal identifier is a PIN.

7. The method of claim 1, wherein the transaction authorization request message further comprises consumer information.

8. The method of claim 1, wherein the personal identifier is encrypted when received by the authentication server computer.

9. The method of claim 1, therein the zero dollar authorization request message is in an ISO 8583 format.

10. The method of claim 1, wherein the personal identifier is encrypted when received by the authentication server computer, and wherein the method further comprises re-encrypting the personal identifier with an issuer key before sending the personal identifier to the issuer computer.

11. The method of claim 1, further comprising:
in response to receiving the authentication indicator, generating a digital certificate.

12. The method of claim 11, wherein the digital certificate is included in the transaction authorization request message.

13. The method of claim 1, wherein the transaction authorization request message that is sent to the issuer computer passes through an acquirer computer.

14. The method of claim 1, wherein the authentication indicator is a binary value.

15. The method of claim 1, wherein the personal identifier is received by the authentication server computer from the mobile device.

16. The method of claim 15, wherein the mobile device comprises a secure application module which receives the personal identifier.

17. An authentication server computer comprising a processor and a computer readable medium comprising code, executable by the processor, for implementing a method comprising:
receiving a personal identifier from a mobile device of a user;
sending the personal identifier to an issuer computer in a zero dollar authorization request message over a first payment network in a verification communication channel;
receiving an authorization response message comprising an authentication indicator from the issuer computer, wherein the authentication indicator indicates successful authentication of the personal identifier;
after successfully completing an initial authentication of the personal identifier with the issuer computer, initiating, by the authentication server computer, a request to the mobile device for registering one or more biometric identifiers of the user, wherein registering includes:
receiving the one or more biometric identifiers from the mobile device;
associating the one or more biometric identifiers with the personal identifier, and
storing the one or more biometric identifiers at a database along with information associated with the personal identifier;
receiving at least one of the one or more biometric identifiers in connection with a transaction over a transaction communication channel that is different than the verification communication channel;
validating the received at least one of the one or more biometric identifiers against the one or more biometric identifiers stored at the database;
generating a verification value validating authenticity of the received at least one of the one or more biometric identifiers; and
transmitting the verification value to a gateway computer during the transaction, wherein the gateway computer initiates a transaction authorization request message for the transaction to the issuer computer including the verification value over a second payment network in the transaction communication channel.

* * * * *